(12) United States Patent
Hillyer et al.

(10) Patent No.: US 11,008,185 B1
(45) Date of Patent: May 18, 2021

(54) SYSTEMS AND METHODS FOR ACTUATION OF FRACKING SLURRY BOXES

(71) Applicant: The Taylor Group, Inc., Louisville, MS (US)

(72) Inventors: Matthew Craig Hillyer, Louisville, MS (US); Richard Warren Patterson, Preston, MS (US); David Todd Palmer, Starkville, MS (US); Quinton Frank Stevenson, Louisville, MS (US)

(73) Assignee: The Taylor Group, Inc., Louisville, MS (US)

( * ) Notice: Subject to any disclaimer, the term of this patent is extended or adjusted under 35 U.S.C. 154(b) by 399 days.

(21) Appl. No.: 16/047,264

(22) Filed: Jul. 27, 2018

(51) Int. Cl.
| | |
|---|---|
| *B65G 65/40* | (2006.01) |
| *E21B 41/00* | (2006.01) |
| *E21B 43/26* | (2006.01) |
| *B65D 90/00* | (2006.01) |
| *B65D 90/62* | (2006.01) |
| *E21B 43/267* | (2006.01) |

(52) U.S. Cl.
CPC ......... *B65G 65/40* (2013.01); *B65D 90/0033* (2013.01); *B65D 90/626* (2013.01); *E21B 41/00* (2013.01); *B65D 2590/664* (2013.01); *B65G 2814/0323* (2013.01); *E21B 43/267* (2013.01)

(58) Field of Classification Search
CPC .. B65G 65/40; B65D 90/0033; B65D 90/626; B65D 2590/664; B65D 2814/0323; E21B 41/00; E21B 43/267
See application file for complete search history.

(56) References Cited

U.S. PATENT DOCUMENTS

| 3,016,157 A * | 1/1962 | Brisson ............... B65F 3/04 |
| | | 414/408 |
| 3,817,414 A | 6/1974 | Peltonen |
| 3,845,726 A | 11/1974 | Fuller |
| 5,163,725 A | 11/1992 | Leweallyn |
| 6,025,663 A | 2/2000 | Hull et al. |
| (Continued) | | |

FOREIGN PATENT DOCUMENTS

EP 1038826 A1 9/2000

*Primary Examiner* — Saul Rodriguez
*Assistant Examiner* — Ashley K Romano
(74) *Attorney, Agent, or Firm* — Lucian Wayne Beavers; Alex H. Huffstutter; Patterson Intellectual Property Law, PC

(57) ABSTRACT

A system for transporting a proppant for fracking may include a transport vehicle, a proppant container, a container clutch part, and a floating clutch part. The transport vehicle may include a carriage having forks for engaging fork pockets of the proppant container. The proppant container may house proppant releasable using a release gate and actuator. The container clutch part may be connected to the proppant container and configured to transfer rotational movement to the actuator. The floating clutch part may be connected to the carriage of the transport vehicle and configured to engage and selectively rotate the container clutch part when the forks engage the fork pockets. The forks and fork pockets vary in size which leads to a potential for misalignment between the container and floating clutch parts. The floating clutch part is vertically and laterally positionable to compensate for misalignments between the container and floating clutch parts.

33 Claims, 20 Drawing Sheets

(56) References Cited

U.S. PATENT DOCUMENTS

| | | | |
|---|---|---|---|
| 8,181,807 B2* | 5/2012 | Hay | B65D 90/0033 |
| | | | 220/8 |
| 9,052,034 B1 | 6/2015 | Wegner et al. | |
| 9,340,353 B2 | 5/2016 | Oren et al. | |
| 9,434,540 B2* | 9/2016 | Goedken | B65F 3/041 |
| 9,758,082 B2* | 9/2017 | Eiden, III | B65G 65/42 |
| 10,399,765 B2* | 9/2019 | Mintz | B65D 88/62 |
| 10,724,341 B2* | 7/2020 | Krippner | E05B 65/52 |
| 2011/0011893 A1 | 1/2011 | Cerny | |
| 2016/0297605 A1 | 10/2016 | Lopez | |

* cited by examiner

SYSTEMS AND METHODS FOR ACTUATION OF FRACKING SLURRY BOXES

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

1. Field of the Invention

The present invention relates generally to transferring proppant for fracking operations using proppant containers.

More particularly, the present invention pertains to systems and methods for transferring proppant using a transport vehicle to move and release proppant from proppant containers.

2. Description of the Prior Art

Hydraulic fracturing or "fracking" has been used for decades to stimulate production from conventional oil and gas wells. In recent years, the use of fracking has increased due to the development of new drilling technology such as horizontal drilling and multi-stage fracking. Such techniques reach previously-unavailable deposits of natural gas and oil. Fracking generally includes pumping fluid into a wellbore at high pressure. Inside the wellbore, the fluid is forced into the formation being produced. When the fluid enters the formation, it fractures, or creates fissures, in the formation. Water, as well as other fluids, and some solid proppants, are then pumped into the fissures to stimulate the release of oil and gas from the formation by keeping the fissures open. Some common proppants include sand, treated sand, and man-made ceramic materials.

Workers are exposed to numerous health risks and hazards throughout the process of delivering, blending, and mixing proppant at a well site. The National Institute for Occupational Safety ("NIOSH") published a hazard alert along with OSHA relating to the health hazards particular to the fracking industry. The hazard alert explains that "[t]ransporting, moving, and refilling silica sand into and through sand movers, along transfer belts, and into blender hoppers can release dust containing silica into the air."

The fracking process typically includes transporting proppant for fracking to well sites in proppant containers using forklifts. Once delivered to a well site, workers at the well site manually engage a sliding gate valve to open the proppant container and release the proppant at the well site. Workers then manually close the sliding gate valve and the forklift re-engages the proppant container to move it away from the well site. Throughout the process, workers are exposed not only to dust from the proppant, but also to certain hazards that inherently accompany the use of heavy equipment around workers.

A need exists in the industry for an automated system for actuating the gate valve on proppant containers from the forklift so as to eliminate the need for workers to manually actuate the gate valve.

BRIEF SUMMARY

The present invention incorporates an engagement apparatus mounted on the forklift carrier and a container clutch part which is connected to the proppant container as well as to the actuator of the sliding gate valve. The forklift pockets on a proppant container are larger than the forks on the forklift so that the operator has some room for misalignment or "slop". The "slop" causes issues with engaging the engagement apparatus. The engagement apparatus includes a floating clutch part which solves the issues caused by misalignment. The floating clutch part floats both vertically and laterally to align the floating clutch part with the container clutch part.

In one embodiment, a method of transferring proppant for fracking is provided. The method includes steps (a) through (d). Step (a) includes engaging a container housing the proppant using at least one lifting attachment connected to a transport vehicle. Step (b) includes engaging a container clutch part connected to the container with a floating clutch part connected to the transport vehicle. Steps (c) includes transporting the container to a release location using the transport vehicle and the at least one lifting attachment. Step (d) includes actuating the container clutch part with the floating clutch part to cause the container to release the proppant at the release location.

Step (b) of such a method may further include automatically aligning the floating clutch part with the container clutch part.

Step (b) of such a method may further include sliding a contoured portion of the floating clutch part within a contoured portion of the container clutch part to align the floating clutch part with the container clutch part.

Step (d) of such a method may further include transferring rotational movement of the container clutch part to an actuator connected to the container to cause the proppant to be released.

Step (d) of such a method may further include rotating the container clutch part in a first direction to open a gate valve connected to the container and thereby release the proppant stored in the container through the gate valve. Step (d) may further include rotating the container clutch part in a second direction to close the gate valve. The second direction is opposite to the first direction.

In another embodiment, an engagement apparatus for a forklift is provided for selectively engaging a container clutch part connected to a fracking proppant container. The engagement apparatus includes a housing and a floating body. The housing is configured to be connected to a carriage of the forklift. The floating body is positioned within the housing. The floating body has an engagement part connected to the floating body which extends beyond the housing away from the carriage. The floating body is laterally positionable within the housing to align the engagement part with the container clutch part in a lateral direction.

The floating body of such an engagement apparatus may be vertically positionable within the housing to align the engagement part with the container clutch part in a vertical direction.

The floating body of such an engagement apparatus may include bumpers connected to the floating body. The bumpers may be configured to prevent the floating body from striking the housing.

The engagement part of such an engagement apparatus may include a contoured portion configured to automatically correct any misalignment when engaging the container clutch part.

The floating body of such an engagement apparatus may be biased toward a central location in the housing using resilient members coupled between the floating body and the housing. The resilient members may be generally aligned with the lateral direction.

The engagement part of such an engagement apparatus may include a friction material connected to an outer surface of the engagement part. The friction material may be configured to prevent slippage between the engagement part and the container clutch part when the engagement part is rotated. The friction material may be disposed along a flat annular outer portion of the engagement part. The friction material may also be disposed in a radial pattern extending outward from a center of a contoured portion of the engagement part. The flat annular outer portion may surround the contoured portion.

Such an engagement apparatus may further include a motor mounted to the floating body which extends beyond the housing toward the carriage. The motor may be configured to rotate the engagement part.

Such an engagement apparatus may further include a mounting bracket connected between the housing and the carriage. The mounting bracket may be configured to allow the housing to move in a rearward direction relative to the carriage when the engagement part engages the container clutch part.

The mounting bracket of such an engagement apparatus may include a base plate and a plurality of posts. The housing may include passageways extending through the housing. The passageways may be configured to receive the posts. Each post may be surrounded by a compressive member. The compressive member may span between the base plate and the housing. The compressive members may be configured to allow movement of the housing in the rearward direction.

In another embodiment, a fracking proppant container is provided. The fracking proppant container may include a storage compartment, a container clutch shaft, a container clutch member, and a linkage. The storage compartment includes a release gate connected to a lower portion of the storage compartment. The release gate includes an actuator which is configured to move the release gate between an open position and a closed position. The container clutch shaft is rotatably connected to the storage compartment. The container clutch member is connected to the container clutch shaft. The linkage connects the container clutch shaft to the actuator. The linkage is configured to transfer rotational movement of the container clutch shaft to the actuator to actuate the release gate.

The container clutch member of such a fracking proppant container may include a contoured portion. The contoured portion may be conically shaped. The contoured portion may be concave.

The container clutch member of such a fracking proppant container may include a flat circular portion surrounding a contoured portion. The flat circular portion may generally be oriented perpendicular to the container clutch shaft.

The linkage of such a fracking proppant container may comprise a first sprocket, a second sprocket, and a drive chain. The first sprocket may be connected to the actuator. The second sprocket may be connected to the container clutch shaft. And the drive chain may extend between the first and second sprockets.

Such a fracking proppant container may also include fork pockets configured to receive forks of a forklift for lifting and moving the fracking proppant container. The fork pockets may be oriented parallel to the container clutch shaft.

In another embodiment, a system for transferring proppant for fracking is provided. The system includes a transport vehicle, a proppant container, a container clutch part, and a floating clutch part. The transport vehicle includes a carriage with forks extending from the carriage. The proppant container includes fork pockets, a storage compartment, and a release gate connected to the storage compartment. The release gate has an actuator for moving the release gate between an open position and a closed position. The fork pockets are configured to receive and engage the forks of the transport vehicle. The container clutch part is connected to the proppant container. The container clutch part is also connected to the actuator. The floating clutch part is connected to the carriage of the transport vehicle and is configured to engage the container clutch part when the forks engage the fork pockets of the proppant container. The floating clutch part is configured to be selectively rotated by the transport vehicle when engaged with the container clutch part to move the release gate between the open and the closed positions.

The container clutch part of such a system may be connected to the actuator in such a manner as to transfer rotational movement from container clutch part to the actuator.

The floating clutch part of such a system may be laterally positionable relative to the carriage in order to align with the container clutch part.

The floating clutch part of such a system may be vertically positionable relative to the carriage in order to align with the container clutch part.

The container clutch part and the floating clutch part of such a system may each include a complementary contoured portion configured to fit together. Each of the contoured portions of the container clutch part and the floating engagement part may be surrounded by a circular flat portion. The contoured portion of the container clutch part may be concave, and the contoured portion of the floating clutch part may be convex. Each fork pocket may include a fork pocket height and a fork pocket width. Each fork may include a fork height and a fork width. The contoured portion of the container clutch part may include a radius which is greater than the greater of one half of a difference between the fork pocket width and the fork width, and a difference between the fork pocket height and the fork height.

Such a system may also include a motor connected to the floating clutch part for driving rotation of the floating clutch part.

DETAILED DESCRIPTION

Figure 1:
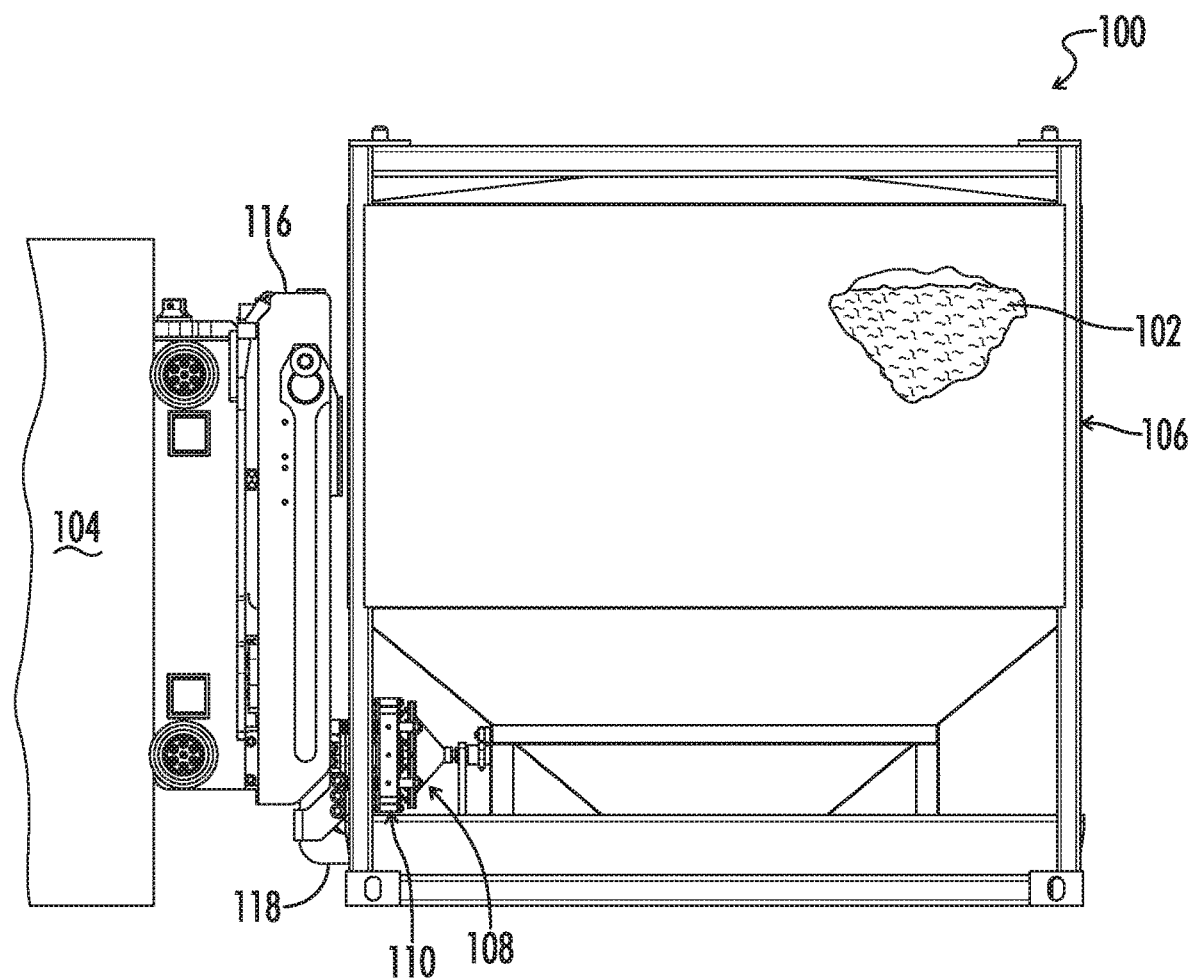
FIG. 1 is a side elevation view of a system for transferring proppant for fracking in accordance with an embodiment of the present invention.
Figure 2:
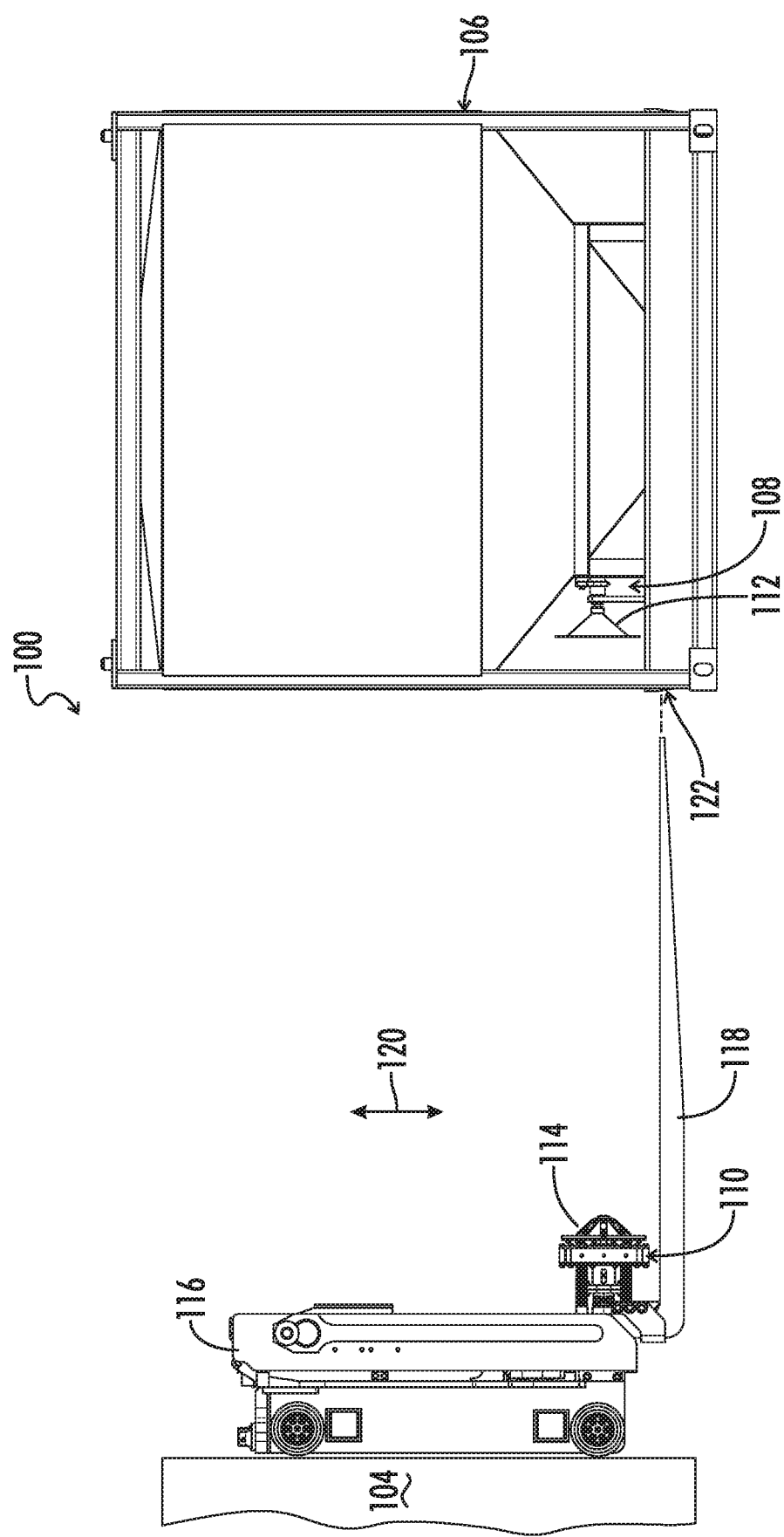
FIG. 2 is an exploded side elevation view of the system of FIG. 1.

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Referring to FIGS. 1-5, a system 100 for transferring proppant 102 for fracking is shown. The system 100 may include a transport vehicle 104, a proppant container 106, a container clutch assembly 108, and a vehicle clutch assembly 110. The container clutch assembly 108 is configured to attach to the proppant container 106 and the vehicle clutch assembly 110 is configured to attach to the transport vehicle 104. The container clutch assembly 108 includes at least a container clutch part 112. The vehicle clutch assembly 110 includes at least a floating clutch part 114. The floating clutch part 114 is configured to engage the container clutch part 112 when the transport vehicle 104 engages the proppant container 106. As used herein, the transport vehicle 104 may also be referred to as a forklift 104. The proppant container 106 may also be referred to herein as a container 106 or a fracking proppant container 106. The vehicle clutch assembly 110 may also be referred to as an engagement apparatus 110. The container clutch part 112 may also be referred to herein as a container clutch member 112. The floating clutch part 114 may also be referred to herein as an engagement part 114.

The vehicle clutch assembly 110 of the system 100 may be installed as original equipment on the transport vehicle 104 or may be installed as a retrofit kit on the transport vehicle 104. Likewise, the container clutch assembly 108 may be installed as original equipment on the proppant container 106 or may be installed as a retrofit kit on the proppant container 106.

The transport vehicle 104 may include a carriage 116 having forks 118 connected to and extending from the carriage 116. The transport vehicle 104 may be configured to move the carriage 116 and forks 118 in a vertical direction 120. The transport vehicle 104 is configured to lift and transport the proppant container 106 between different locations. Each fork 118 may include a common fork height 118H and a common fork width 118W. The vehicle clutch assembly 110 may be connected to the carriage 116 of the transport vehicle 104 so as to move in unison with the forks 118.

Figure 3:
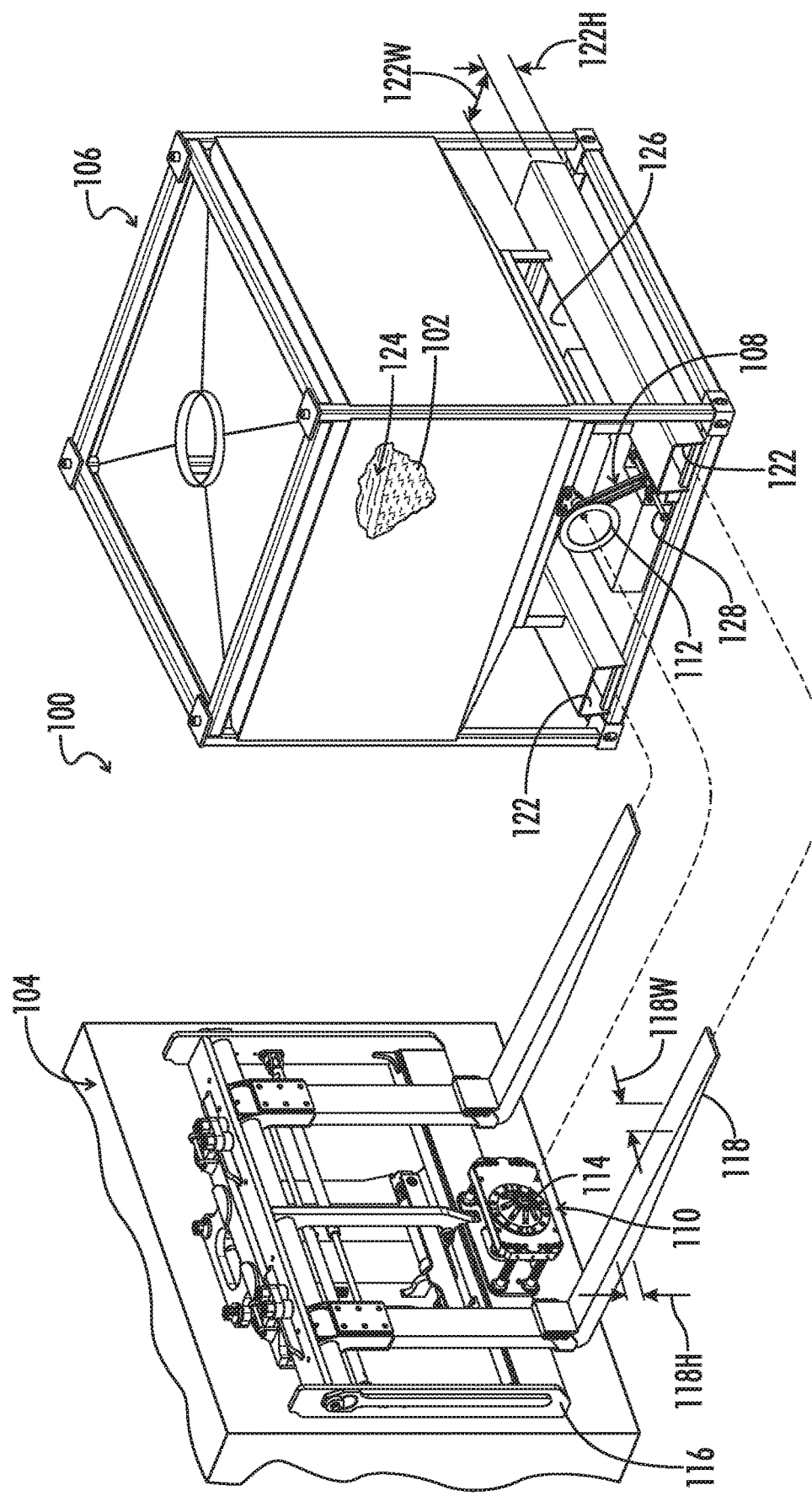
FIG. 3 is an exploded and rotated upper perspective view of the system of FIG. 1.
Figure 4:
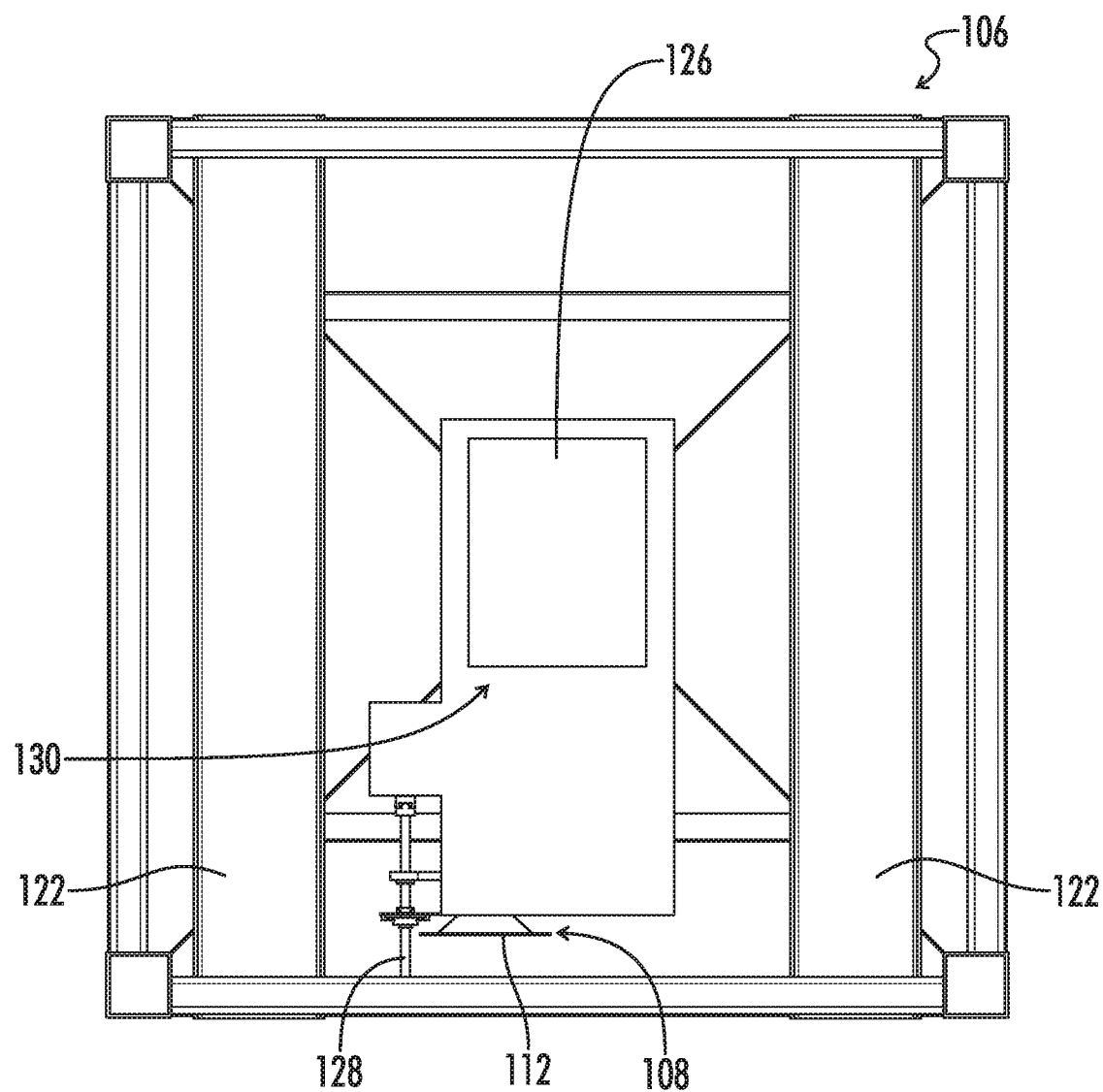
FIG. 4 is a bottom plan view of the system of FIG. 1 having a release gate in a closed position.
Figure 5:
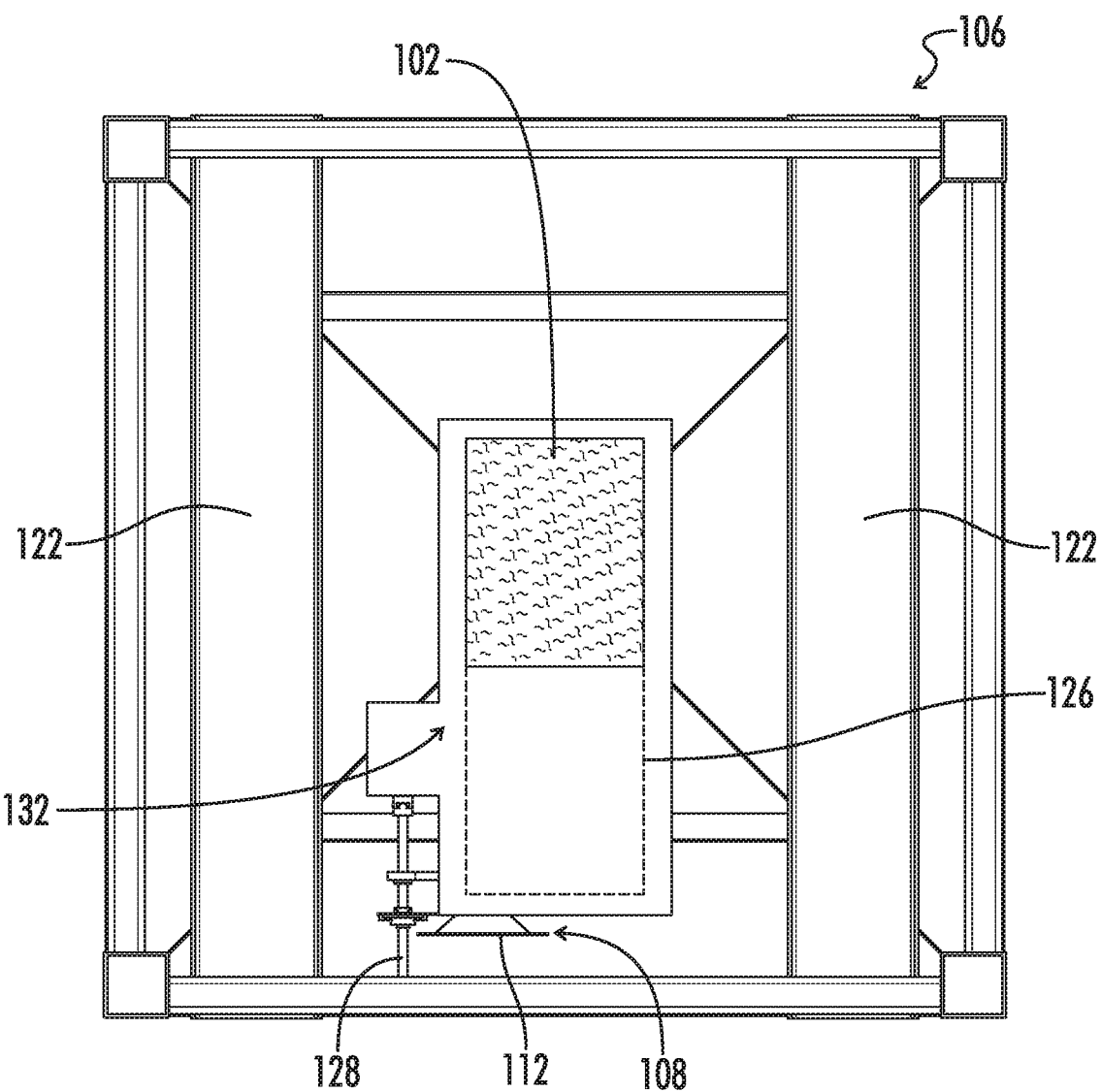
FIG. 5 is a bottom plan view of the system of FIG. 1 having the release gate in an open position.

As can best be seen in FIG. 3, the proppant container 106 may include fork pockets 122, a storage compartment 124, and a release gate 126. The fork pockets 122 may be configured to receive the forks 118 of the transport vehicle 104. The fork pockets 122 may be engaged by the forks 118 to lift and lower the proppant container 106 along the vertical direction 120. Each fork pocket 122 may include a common fork pocket height 122H and a common fork pocket width 122W. The fork pocket height 122H may be greater than or equal to the fork height 118H. The fork pocket width 122W may be greater than or equal to the fork width 118W. The storage compartment 124 may be configured to receive and house the proppant 102 for fracking. The release gate 126 may be connected to the storage compartment 124. The release gate 126 may include an actuator 128 for moving the release gate 126 between a closed position 130 (FIG. 4) and an open position 132 (FIG. 5). The proppant 102 may be released as a gravity fed flow when the release gate 126 is in the open position 132 and securely stored when the release gate 126 is in the closed position 130.

The proppant container 106 without the container clutch assembly 108 (e.g., a proppant container having fork pockets and a storage compartment with a release gate controlled by an actuator) is known in the prior art. When the container clutch assembly 108 is installed as a retrofit kit, various parts of the container clutch assembly 108 may be attached to the proppant container 106. Additionally, the actuator 128 may be replaced with an identical actuator which includes a keyway (not show) to facilitate mounting a sprocket (the sprocket described in further detail below).

As illustrated, the fork pocket height 122H is greater than the fork height 118H and the fork pocket width 122W is greater than the fork width 118W. For example, the fork pocket height 122H may be 7.5 inches and the fork pocket width 122W may be 13.25 inches. The fork 118H may be 4 inches and the fork width may be 8 inches. The difference between the heights and widths of the fork 118 and fork pockets 122 may lead to misalignment or "slop" between the forks 118 and the fork pockets 122. Generally, an ideal location for the fork 118 within the fork pocket 122 is at the highest most point within the fork pocket 122 and centered along the fork pocket width 122W. "Slop" in the vertical direction 120 may be defined as the maximum distance from the ideal location that the fork 118 may be inserted into the fork pocket 122. "Slop" in a lateral direction 134 may be defined as the maximum distance from the ideal location that the fork 118 may be inserted into the fork pocket 122. Based on the ideal location of the forks 118 within the fork pockets 122, "slop" in the vertical direction 120 may be equal to a difference between the fork pocket height 122H and the fork height 118H. "Slop" in the lateral direction 134 may be equal to one-half of a difference between the fork pocket width 122W and the fork width 118W. In the above example, the forks may be capable of 3.5 inches of "slop" in the vertical direction 120 and may be capable of 2.625 inches of "slop" in the lateral direction 134. The container clutch part 112 and floating clutch part 114 are designed to compensate for the "slop".

The container clutch part 112 of the container clutch assembly 108 may be connected to the proppant container 106. The container clutch part 112 may further be connected to the actuator 128 such that rotational movement of the container clutch part 112 is transferred to the actuator 128 for actuating the release gate 126 between the closed and open positions 130, 132.

Figure 17A:
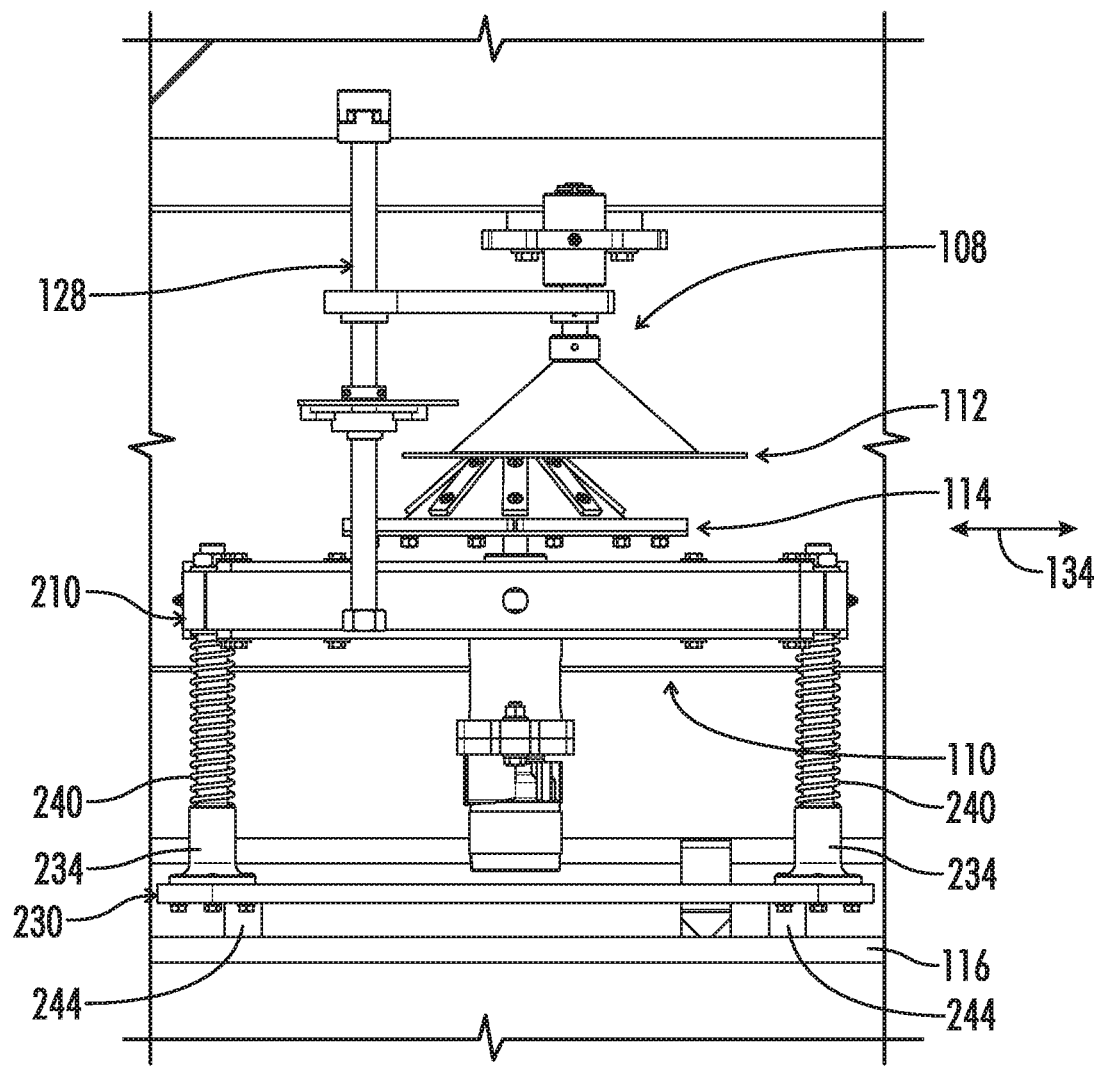
FIG. 17A is a lower plan view of the system of FIG. 1 with the floating clutch part and the container clutch part misaligned in the lateral direction.
Figure 17B:
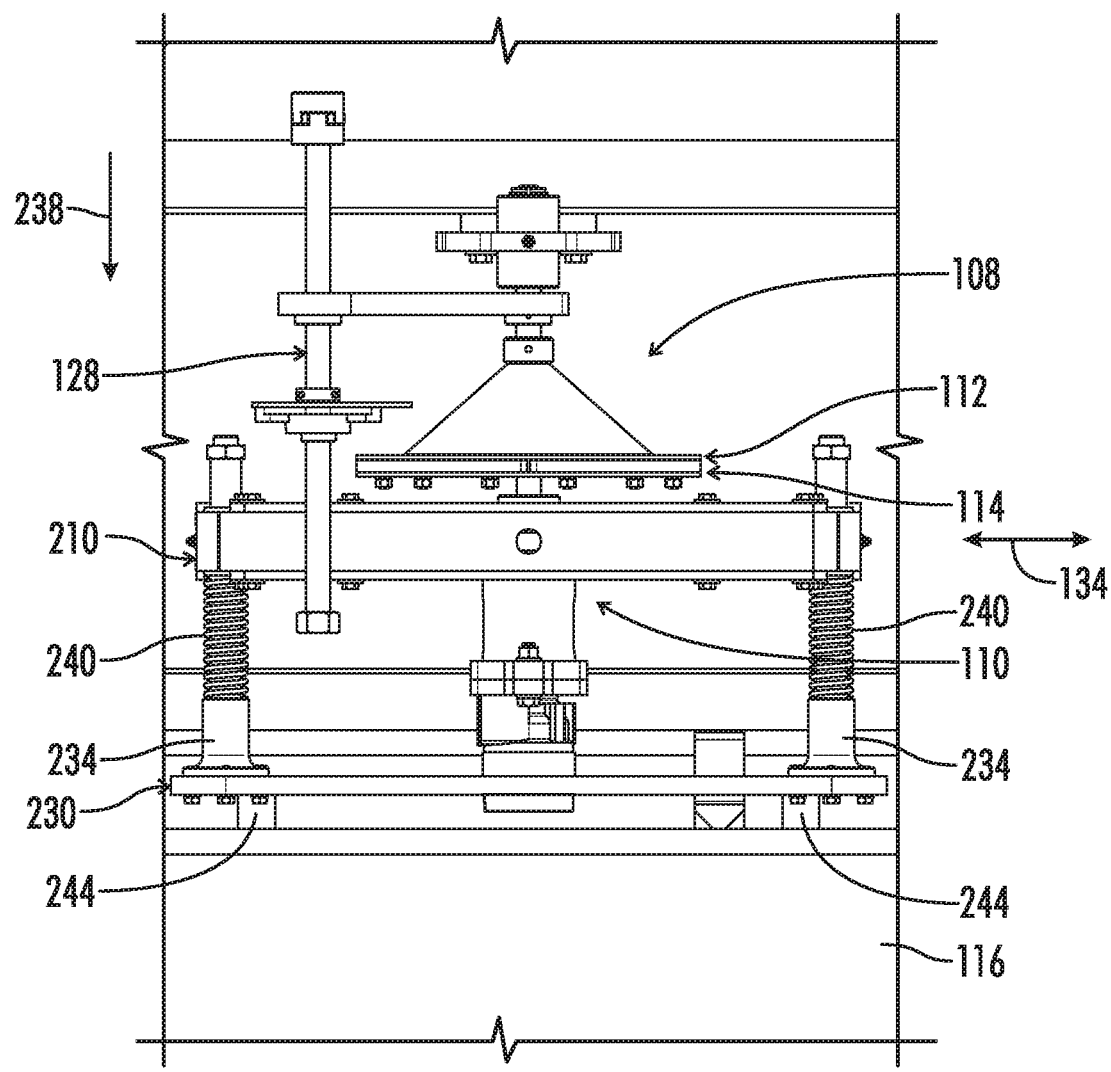
FIG. 17B is a lower plan view of the system of FIG. 17A with the floating clutch part aligned and engaged with the container clutch part.
Figure 18A:
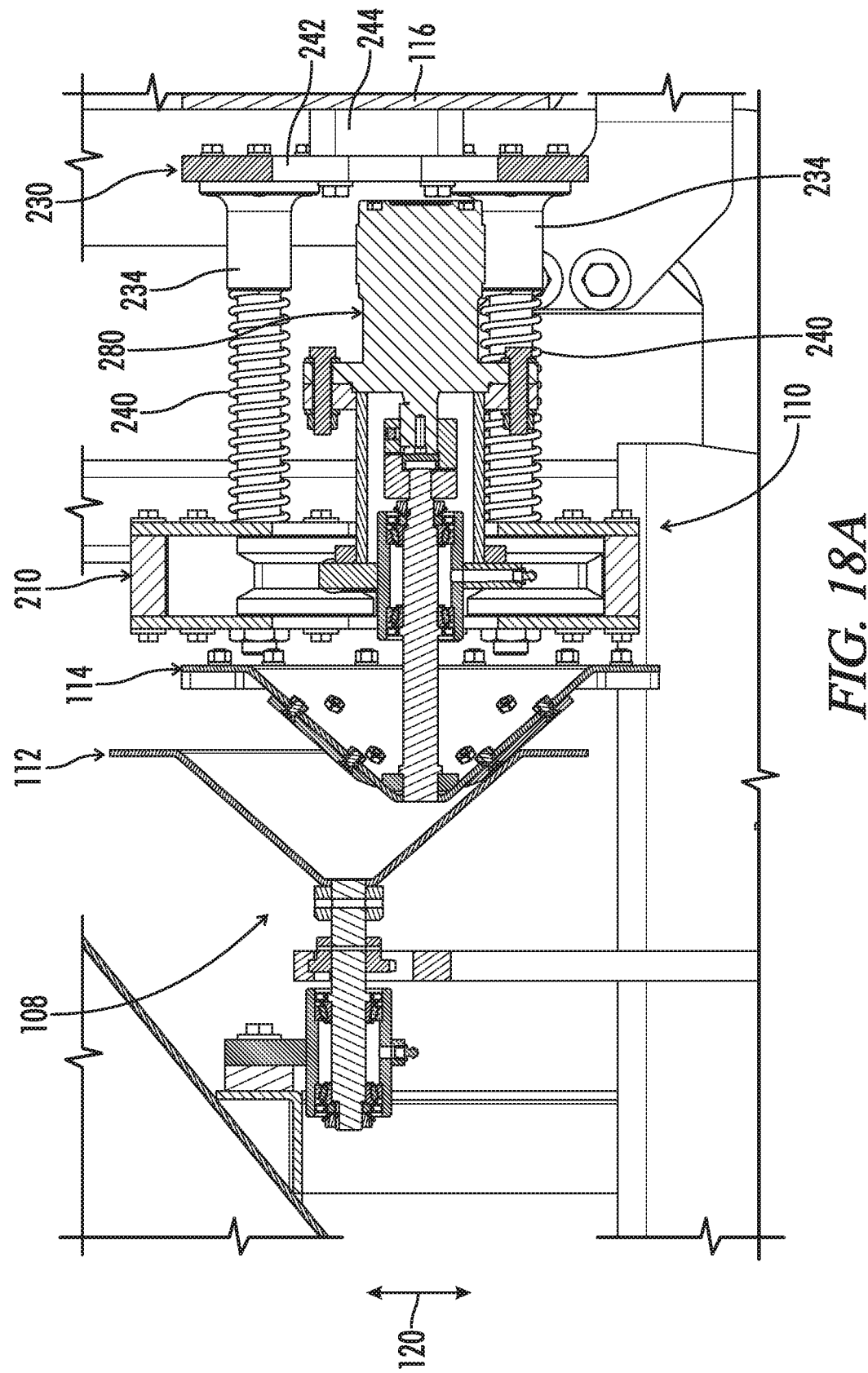
FIG. 18A is a side elevation view of the system of FIG. 1 with the floating clutch part with and container clutch part misaligned in the vertical direction.
Figure 18B:
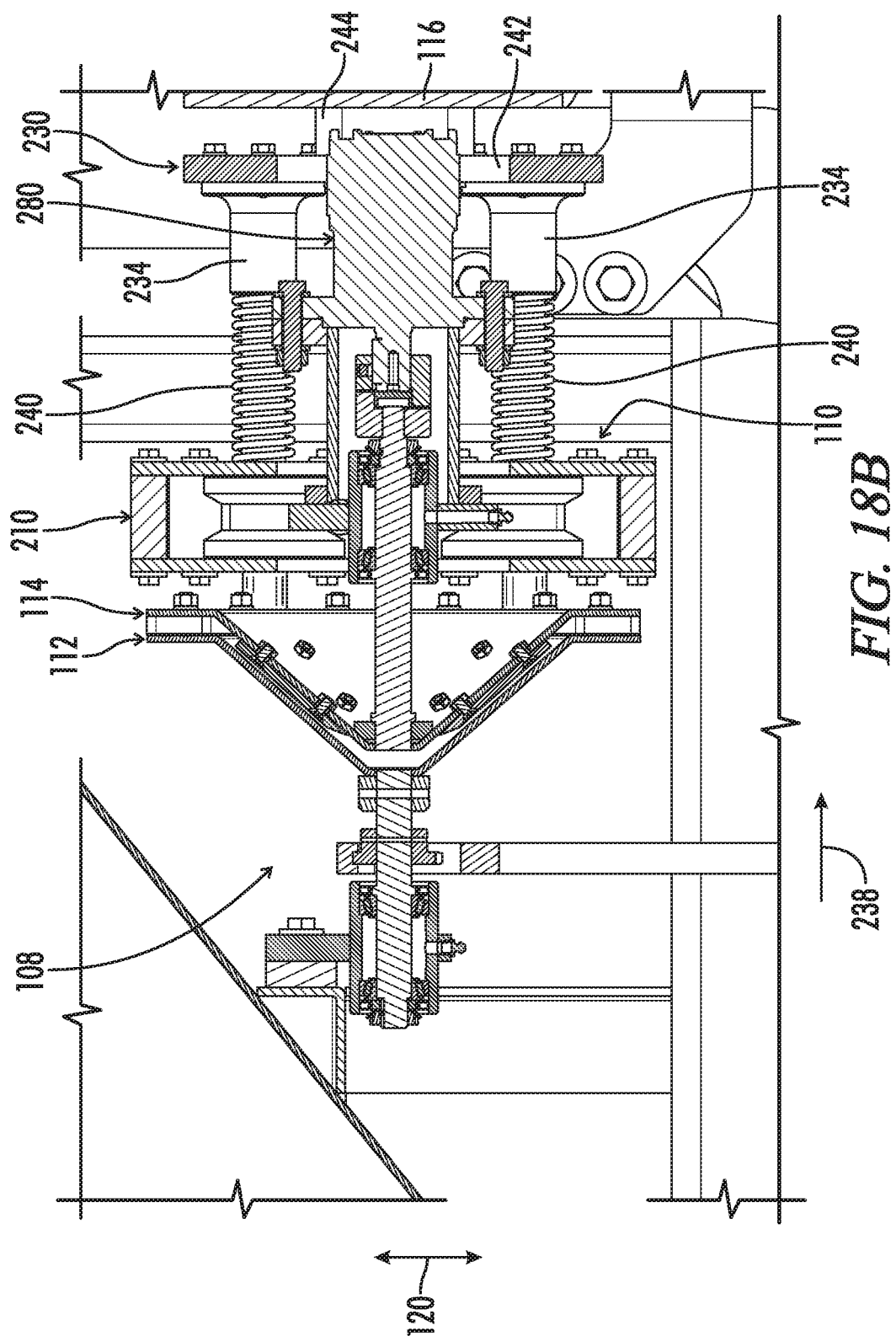
FIG. 18B is a side elevation view of the system of FIG. 18B with the floating clutch part aligned and engaged with the container clutch part in the vertical direction.

The floating clutch part 114 of the vehicle clutch assembly 110 may be configured to be selectively rotated by the transport vehicle 104. When the floating clutch part 114 is engaged with the container clutch part 112, the floating clutch part 114 may actuate the release gate 126 between the open and closed positions 130, 132. As can best be seen in FIGS. 17A and 17B, the floating clutch part 114 may be laterally positionable relative to the carriage 116 in the lateral direction 134 to align with the container clutch part 112. The lateral adjustability of the floating clutch part 114 is important in order to compensate for potential "slop" in the lateral direction 134 between the forks 118 and the fork pockets 122. As can best be seen in FIGS. 18A and 18B, the floating clutch part 114 may also be vertically positionable relative to the carriage 116 in the vertical direction 120 to align with the container clutch part 112. The vertical adjustability of the floating clutch part 114 is important in order to compensate for potential "slop" in the vertical direction 120 between the forks 118 and the fork pockets 122.

Figure 6:
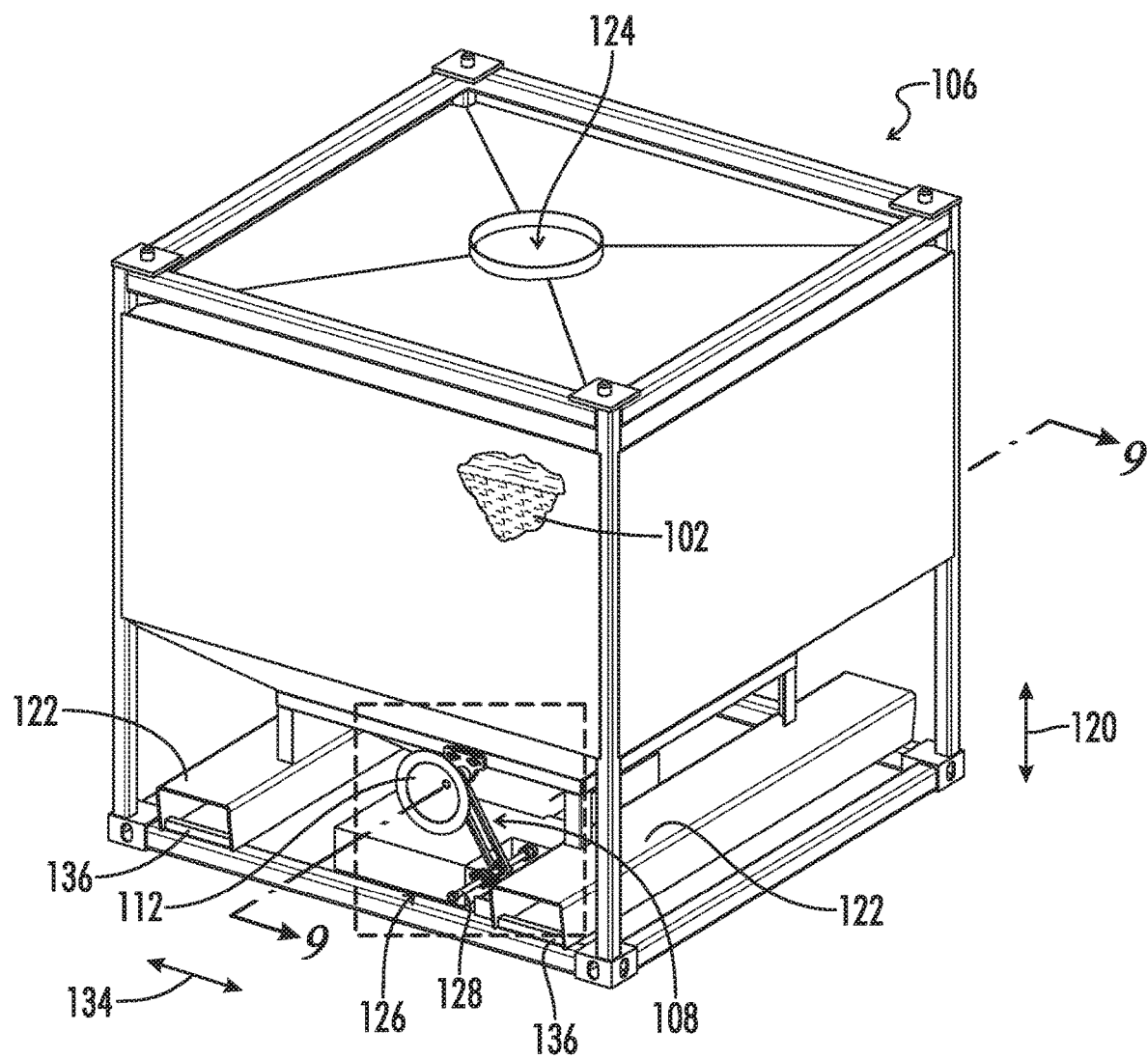
FIG. 6 is a perspective view of a proppant container for housing proppant in accordance with an embodiment of the present invention.
Figure 7:
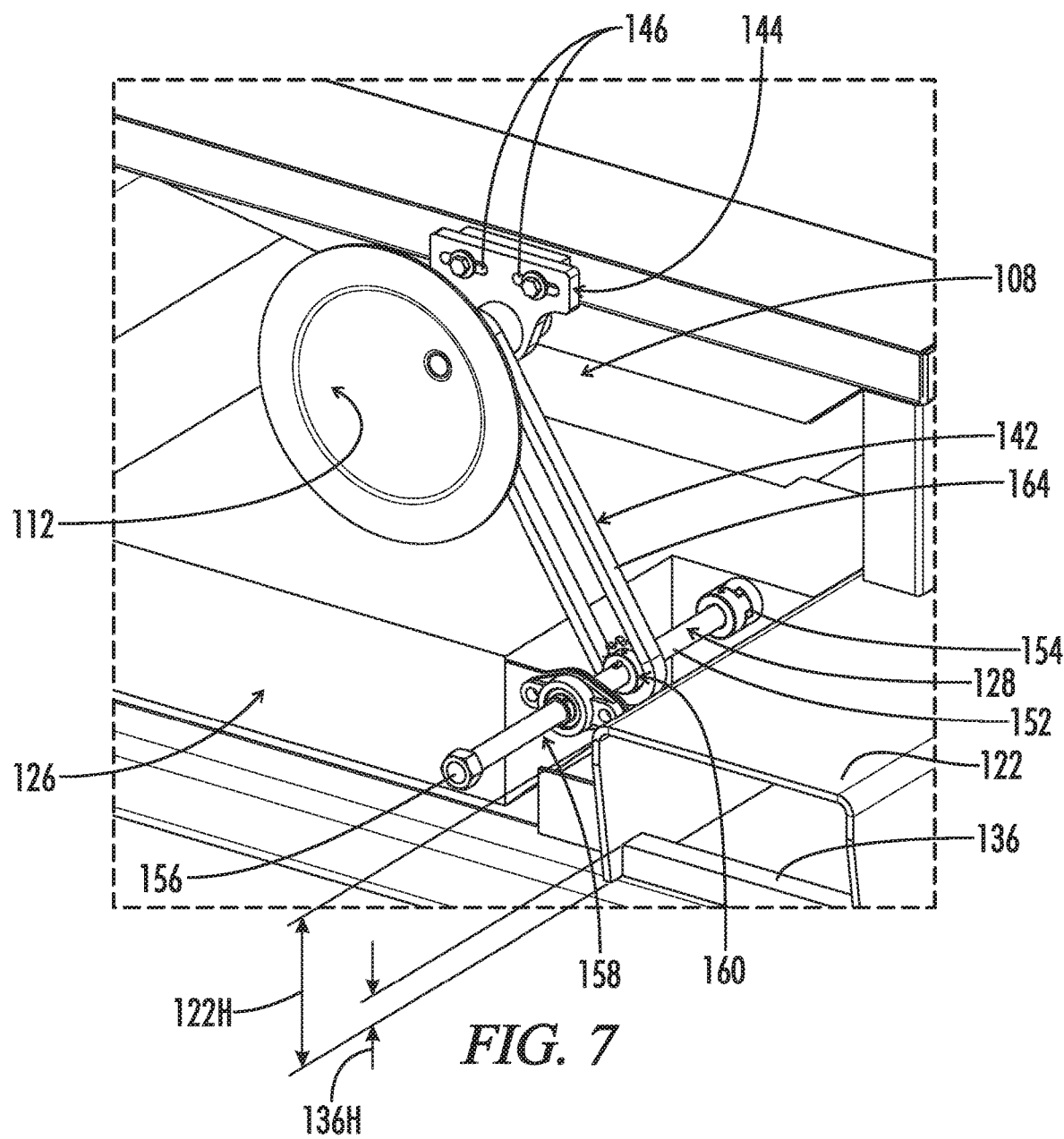
FIG. 7 is an enlarged perspective view of the container clutch part and actuator of FIG. 6.

As can best be seen in FIGS. 6 and 7, the system 100 may further include fork pocket spacers 136. The fork pocket spacers 136 may be connected within the fork pockets 122 to limit movement of the forks 118 in the vertical direction 120 when received by the fork pockets 122. The fork pocket spacers 136 effectively reduce the fork pocket height 122H and incidentally also reduce "slop" in the vertical direction 120. The fork pocket spacers 136 may include a fork pocket spacer height 136H (FIG. 7). As illustrated, the fork pocket spacer height 136H may be 1.5 inches. When the fork pocket spacers 136 are utilized, the effective fork pocket height 122H may be 6 inches and "slop" in the vertical direction 120 may be reduced to 2 inches.

Referring to FIGS. 6-9, the proppant container 106 and the container clutch assembly 108 are shown in more detail. The container clutch assembly 108 may include a container clutch shaft 140, a linkage 142, and a container mounting bracket 144. The container clutch shaft 140 may be parallel to the fork pockets 122 of the proppant container 106. The container clutch shaft 140 may be connected between the container clutch part 112 and the container mounting bracket 144. The container clutch shaft 140 may be configured to rotatably connect the container clutch part 112 to the container mounting bracket 144. The linkage 142 may be configured to connect the container clutch shaft 140 to the actuator 128 to transfer rotational movement of the container clutch shaft 140 to the actuator 128 to actuate the release gate 126.

The container mounting bracket 144 may include at least two screw slots 146 (FIG. 7) configured to receive bolts for attaching the container mounting bracket 144 to the proppant container 106. The two screw slots 146 allow for slight adjustability of the container mounting bracket 144 relative to the proppant container 106 in the lateral direction 134. The container mounting bracket 144 may further include a bearing housing 148 configured to receive the container clutch shaft 140. The container clutch shaft 140 may be received in two spaced roller bearings 150 contained in the bearing housing 148.

Rotatable connections as used herein may refer to a bearing type connection or other rotatable connection configuration or type. In an exemplary embodiment, the bearings 150 are tapered roller bearings due to their ability to take force in an axial direction.

Figure 8:
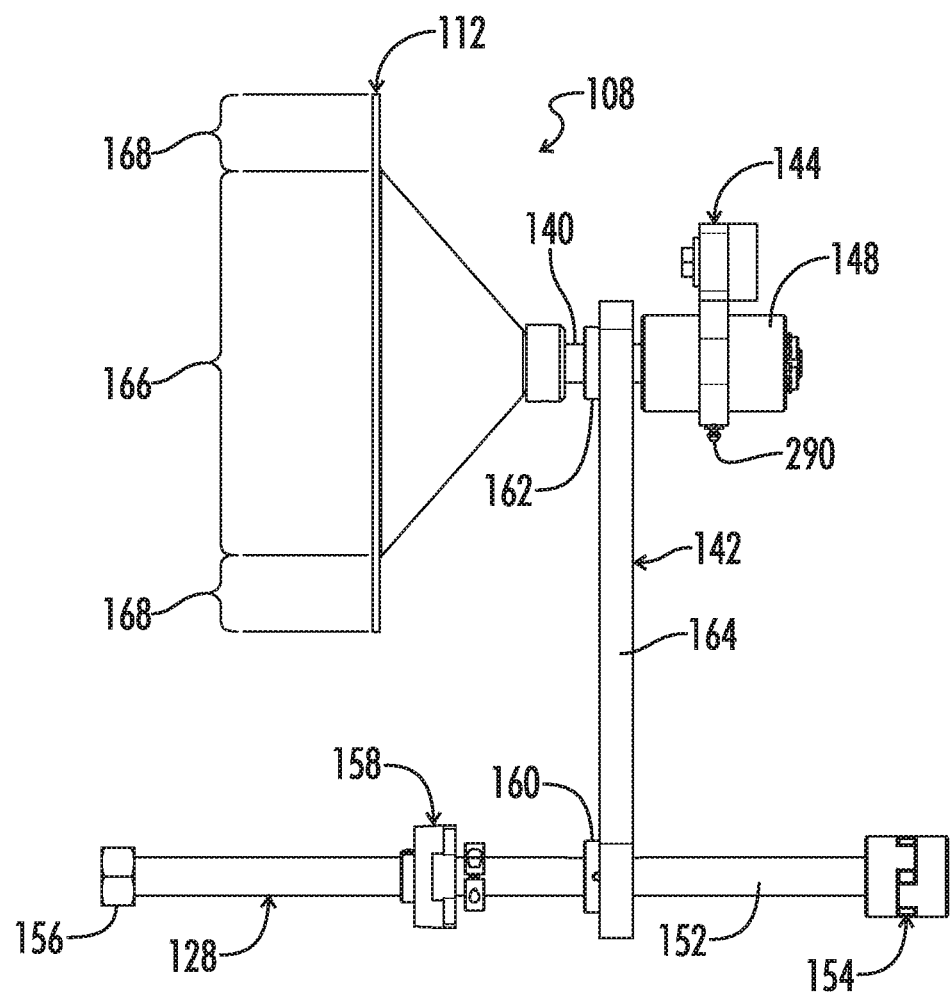
FIG. 8 is a schematic side elevation view of the container clutch part and actuator of FIG. 7.

As can best be seen in FIGS. 7 and 8, the actuator 128 may include an actuator shaft 152 connected to the release gate 126 using a jaw coupling 154. A free end of the actuator shaft 152 distal the release gate 126 includes a hex nut 156 used for manual actuation of the release gate 126. The actuator 128 may further include a support 158 rotatably connected to the actuator shaft 152 between the jaw coupling 154 and the hex nut 156.

Figure 9:
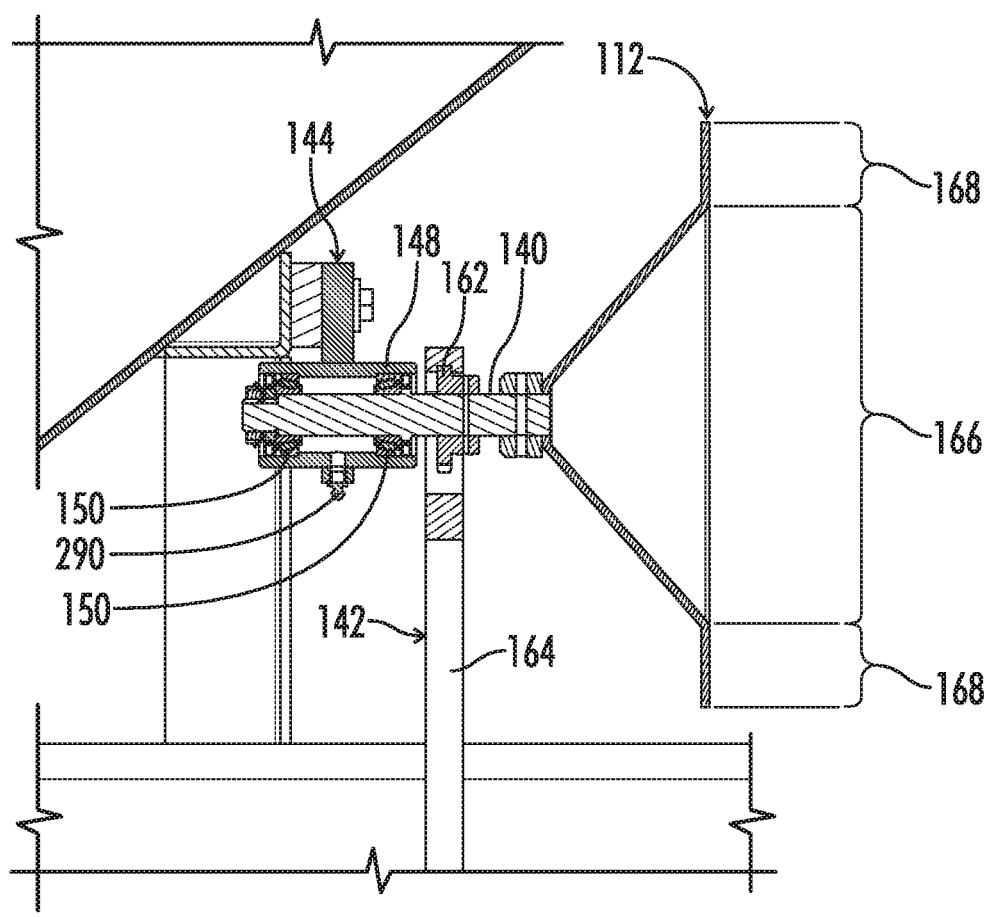
FIG. 9 is an enlarged cross-sectional side view of the container clutch part and actuator of FIG. 6 taken along line 9-9 of FIG. 6.
Figure 10:
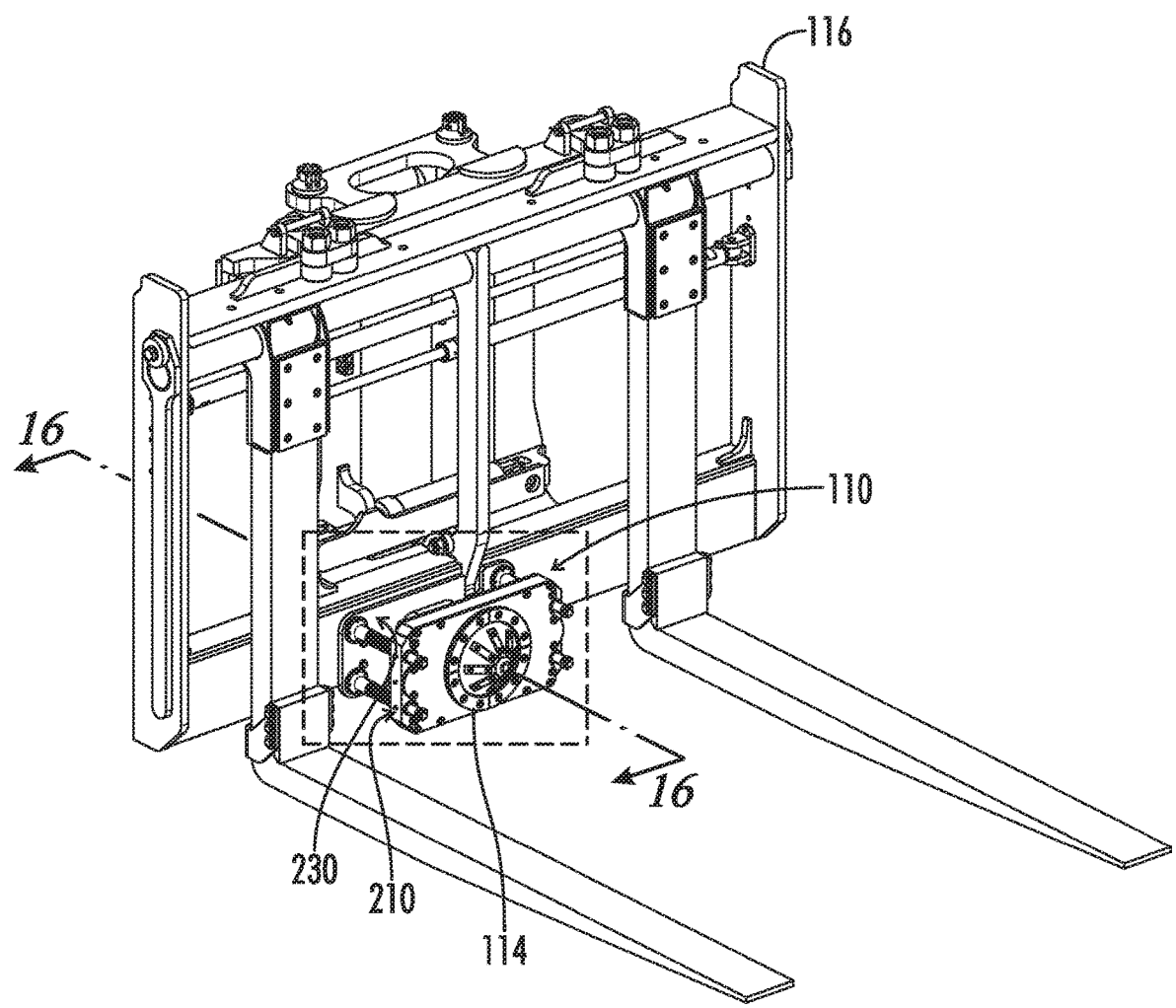
FIG. 10 is a perspective view of a carriage of a transport vehicle including a vehicle clutch assembly in accordance with an embodiment of the present invention.

As can best be seen in FIGS. 7-9, the linkage 142 may include a first sprocket 160, a second sprocket 162, and a drive chain 164. The first sprocket 160 may be connected to the actuator shaft 152 and the second sprocket 162 may be connected to the container clutch shaft 140. The first and second sprockets 160, 162 may be connected together using the drive chain 164. The sprockets and drive chain combination may ensure that rotational movement from the container clutch part 112 is efficiently and effectively transferred to the actuator 128 and release gate 126. As shown, the sprockets 160, 162 have identical diameters which may equate to a gear ratio of 1:1. In other embodiments (not shown), sprockets of different diameters may be selected in order to adjust the gear ratio between the container clutch part 112 and the actuator 128. The drive chain 164 and sprockets 160, 162 will be able to be varied for speeds necessary and fits necessary for different proppant container 106 models which incorporate the release gate 126 and actuator 128 setup.

The container clutch part 112 may include a contoured portion 166 and a flat circular portion 168 surrounding the contoured portion 166. The flat circular portion 168 may also be referred to herein as a flat annular outer portion 168. As can best be seen in FIGS. 8 and 9, the flat circular portion 168 is generally perpendicular to the container clutch shaft 140. The contoured portion 166 may be conically shaped. As shown in the illustrated embodiment, the contoured portion 166 is concave (e.g., female). In an alternative embodiment (not shown), the contoured portion 166 may be convex (e.g., male).

Referring to FIGS. 10-18B, the vehicle clutch assembly 110 is shown in more detail. As can best be seen in FIGS. 10 and 11, the vehicle clutch assembly 110 may include a housing 210 with the floating clutch part 114 extending from the housing 210, and a vehicle mounting bracket 230 for connecting the housing 210 to the carriage 116 of the transport vehicle 104. As can best be seen in FIGS. 12-14, the vehicle clutch assembly 110 may further include a floating body 250 positioned within the housing 210 and connected to the floating clutch part 114. The floating clutch part 114 may extend beyond the housing 210 away from the carriage 116.

The housing 210 may include a front face plate 212, a rear face plate 214 spaced apart from the front face plate 212, and perimeter walls 216 positioned between and connecting the front and rear face plates 212, 214. A cavity 218 for receiving the floating body 250 is defined between the front and rear face plates 212, 214 and the perimeter walls 216. The front and rear face plates 212, 214 and the perimeter walls 216 are shown bolted together, however, in other embodiments these components may be welded or connected together using other means as known to one of ordinary skill in the art.

Each of the front and rear face plates 212, 214 may include a respective window 220. The windows 220 are configured to allow for attachments to the floating body 250 which float (or move in unison) with the floating body 250 and extend beyond either the front or rear face plate 212, 214. As illustrated, the window 220 of the front face plate 212 matches and aligns with the window 220 of the rear face plate 214. In other embodiments (not shown), the windows may be of different sizes to accommodate different attachments to the floating body 250.

The housing 210 may further include a plurality of passageways 222 extending through the perimeter wall 216 between the front face plate 212 and the rear face plate 214. Each passageway 222 may include flange sleeve bearings 224 received from each end of the passageway 222. The vehicle mounting bracket 230 may connect to the housing 210 using the plurality of passageways 222.

Figure 11:
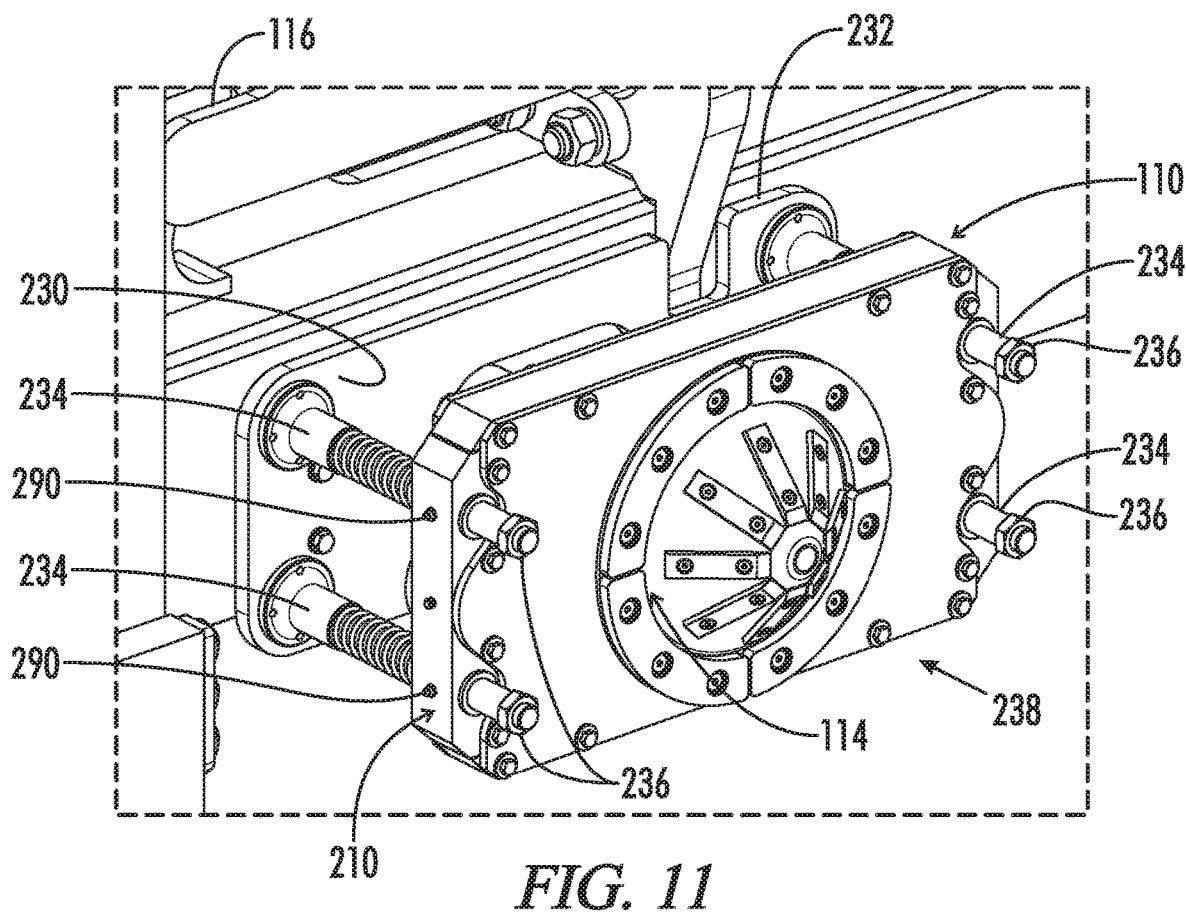
FIG. 11 is an enlarged perspective view of the vehicle clutch assembly of FIG. 10.
Figure 15:
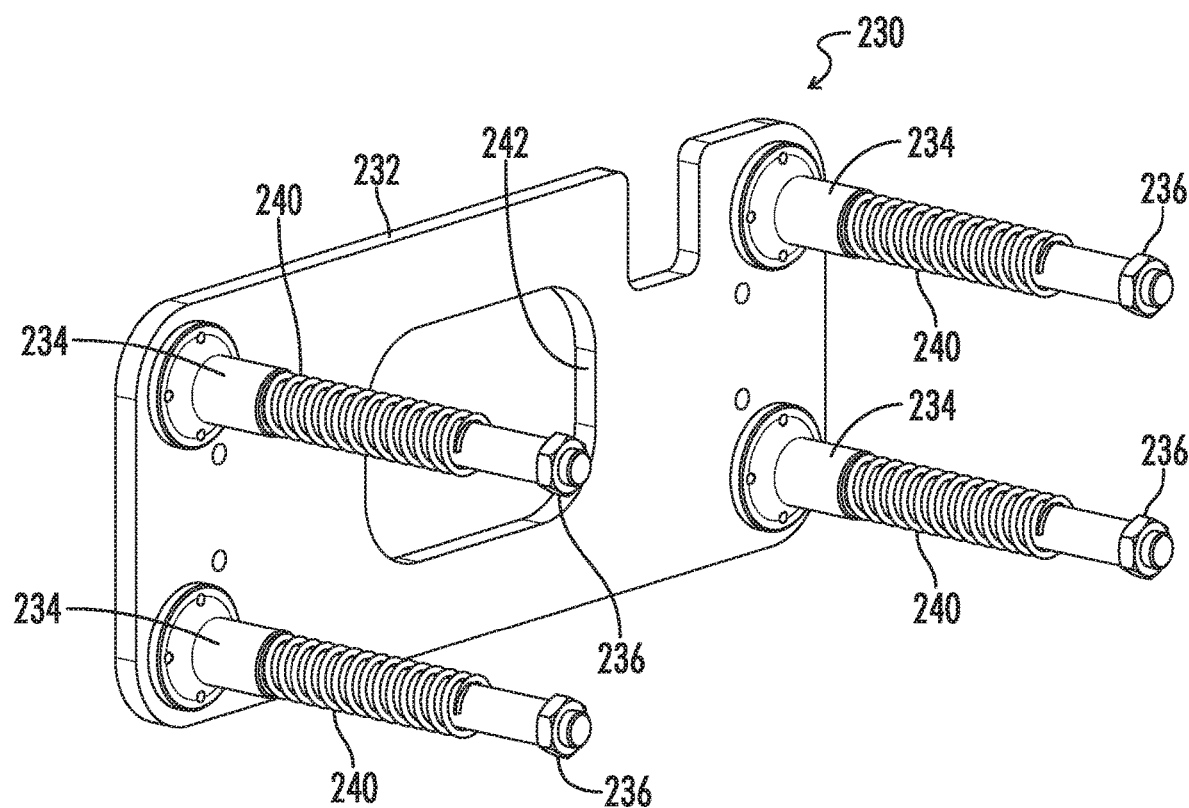
FIG. 15 is a perspective view of a vehicle mounting bracket of the vehicle clutch assembly of FIG. 10.

As can best be seen in FIGS. 11 and 15, the vehicle mounting bracket 230 may include a base plate 232 for mounting to the carriage 116 of the transport vehicle 104 and a plurality of posts 234 extending from the base plate 232. The plurality of posts 234 may extend perpendicularly from the base plate 232 away from the carriage 116. Each post 234 may be positioned through an associated passageway 222 of the housing 210 such that the rear face plate 214 of the housing 210 faces the carriage 116. Each post 234 may include a flange 236 attachable to a free end of the post 234 extending through the passageway 222 proximate the front face plate 212. The flanges 236 may be configured to keep the posts 234 from pulling through the passageways 222 once inserted. As illustrated, the flanges 236 are hex nuts, however in other embodiments, the flanges 236 may be different.

As can best be seen in FIGS. 17A-18B, the vehicle mounting bracket 230 may be configured to allow the housing 210 to move in a rearward direction 238 relative to the carriage 116 when the floating clutch part 114 engages the container clutch part 112. Movement of the housing 210 in the rearward direction 238 may absorb forces associated with the initial impact of the floating clutch part 114 with the container clutch part 112.

The vehicle mounting bracket 230 may further include a plurality of compressive members 240, each compressive member 240 surrounding one post 234. Each compressive member 240 circumscribes an associated post 234 and spans between the base plate 232 and the housing 210 proximate the rear face plate 214. Each compressive member 240 may also be referred to herein as a compressive spring 240. The compressive members 240 may be configured to allow movement of the housing 210 in the rearward direction 238. The compressive members 240 may absorb the forces, as previously mentioned, associated with the floating clutch part 114 engaging the container clutch part 112.

The base plate 232 of the vehicle mounting bracket 230 may include a base plate window 242. The base plate window 242 is configured to allow for additional clearance in both the vertical direction 120 and the lateral direction 134 for a rearwardly extending attachment to the floating body 250 extending beyond the housing 210 toward the carriage 116 of the transport vehicle 104. The base plate window 242 provides additional clearance for the rearwardly extending attachment as the housing 210 moves in the rearward direction 238. As can best be seen in FIG. 16-18B, the vehicle mounting bracket 230 may include mounting bracket spacers 244 positioned between the base plate 232 and the carriage 116. The mounting bracket spacers 244 may further increase clearance for a rearwardly extending attachment as the housing 210 moves in the rearward direction 238.

Figure 12:
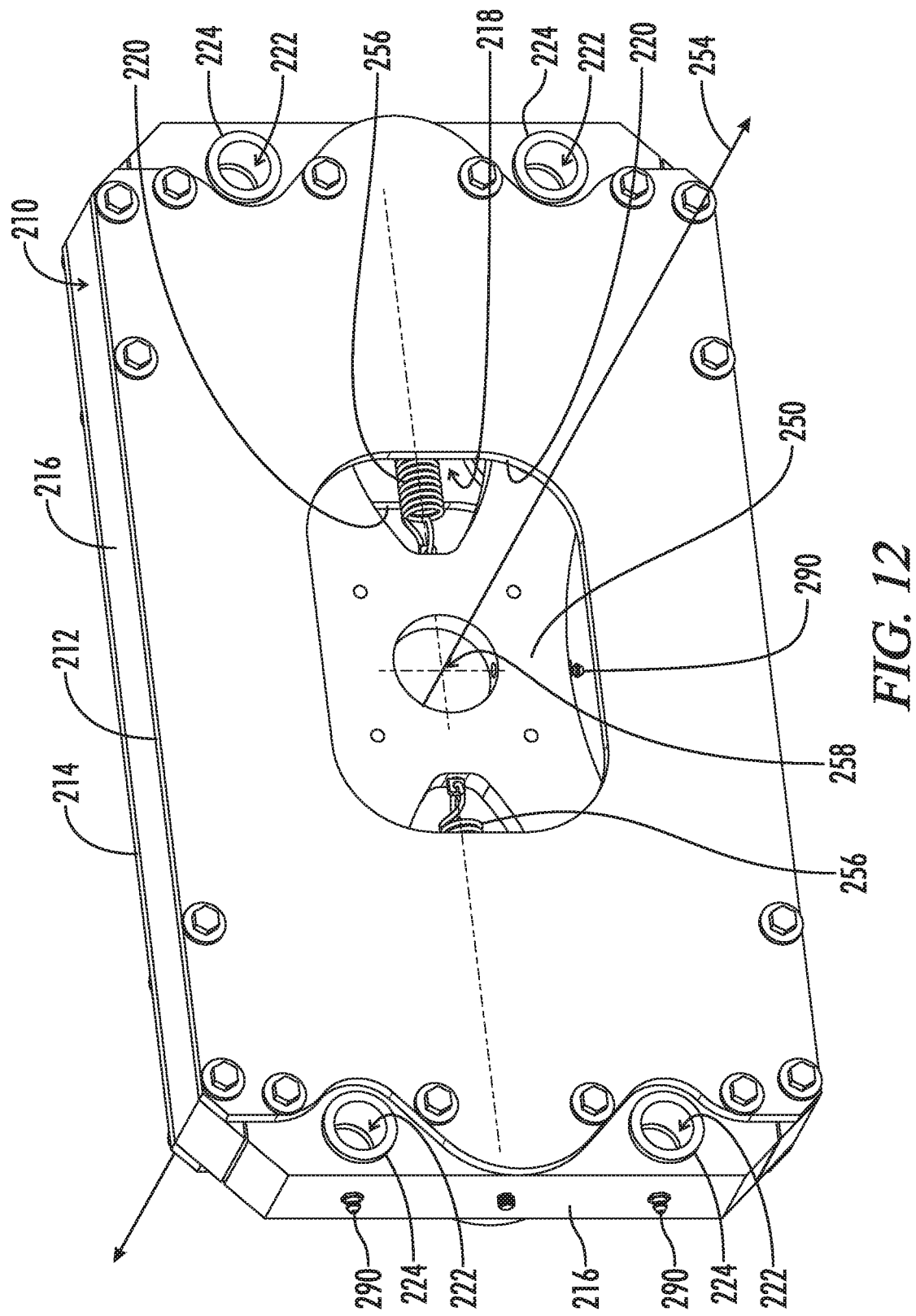
FIG. 12 is a perspective view of a housing and floating body of the vehicle clutch assembly of FIG. 10.
Figure 13:
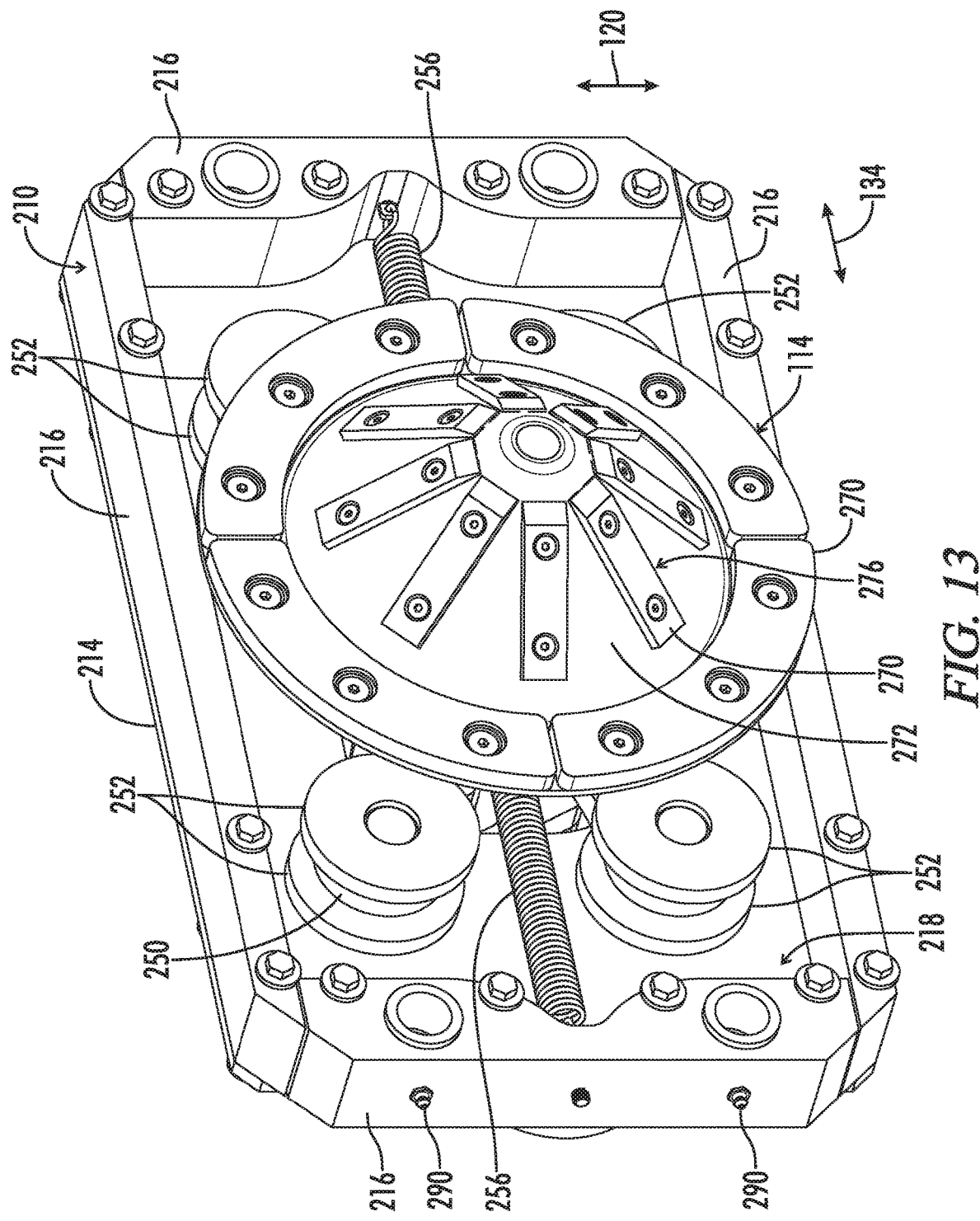
FIG. 13 is a front perspective view of the housing and floating body of FIG. 10 with the front face plate removed and including the floating clutch part.
Figure 14:
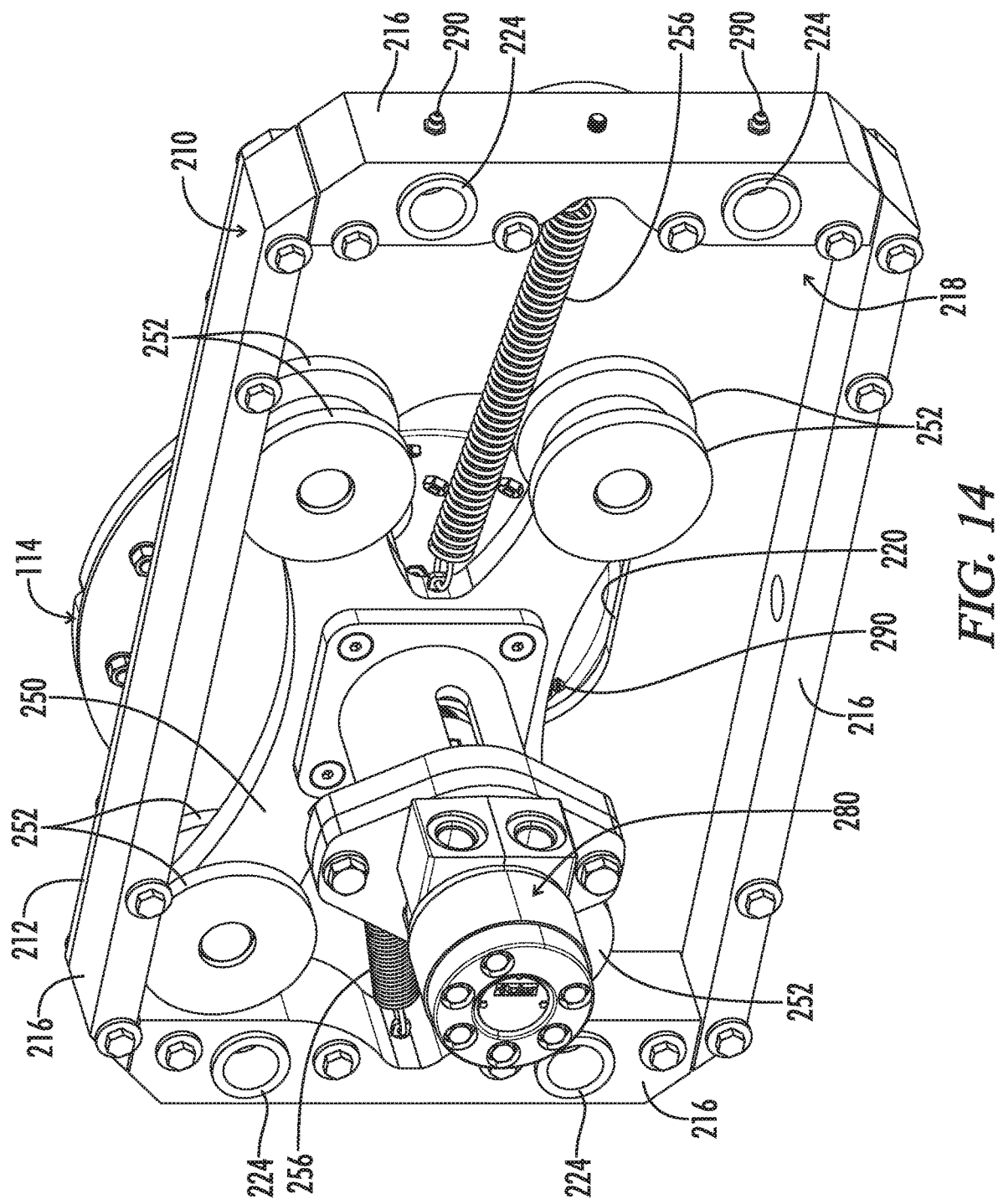
FIG. 14 is a rear perspective view of the housing and floating body of FIG. 10 with the rear face plate removed and including a motor.

As can best be seen in FIGS. 12-14, the floating body 250 of the vehicle clutch assembly 110 may include a plurality of bumpers 252. The plurality of bumpers 252 may also be referred to herein as a plurality of wear pads 252. The plurality of bumpers 252 may be configured to prevent the floating body 250 from striking or binding within the housing 210. The plurality of bumpers 252 may also be configured to engage the perimeter walls 216 of the housing 210 in order to counteract rotation of the floating body 250 when acted upon by either the floating clutch part 114 or a rearwardly extending attachment. As illustrated, the floating body 250 is generally X-shaped. The floating body 250 may be shaped differently in other embodiments (not shown). Each corner of the floating body 250 includes at least one bumper 252. As illustrated, each corner of the floating body 250 includes one bumper 252 positioned between the floating body 250 and the front face plate 212 of the housing 210 and one bumper 252 positioned between the floating body 250 and the rear face plate 214 of the housing 210.

The floating body 250 may be laterally positionable within the housing 210 to align the floating clutch part 114 with the container clutch part 112 in the lateral direction 134. The floating body 250 may also be vertically positionable within the housing 210 to align the floating clutch part 114 with the container clutch part 112 in the vertical direction 120. The floating body 250 may be biased toward a central axis 254 defined by the housing 210 using resilient members 256. The central axis 254 may be defined perpendicularly to both the front and rear face plates 212, 214 and may be approximately centered through the housing 210. More generally, the floating body 250 may be biased toward a central location of the housing 210. The position of rest of the floating body 250 is generally around the central location of the housing 210 and may or may not be aligned with the central axis 254. The resilient members 256 may also be referred to herein as resilient springs 256. The resilient members 256 may be connected between the floating body 250 and the perimeter walls 216 of the housing 210. The resilient members 256 may be generally aligned with the lateral direction 134.

As can best been seen in FIG. 12, the floating body 250 may include a floating body passageway 258 positioned centrally through the floating body 250. When the floating body 250 is positioned around the central axis 254, the floating body passageway 258 may also be centered on the central axis 254.

Figure 16:
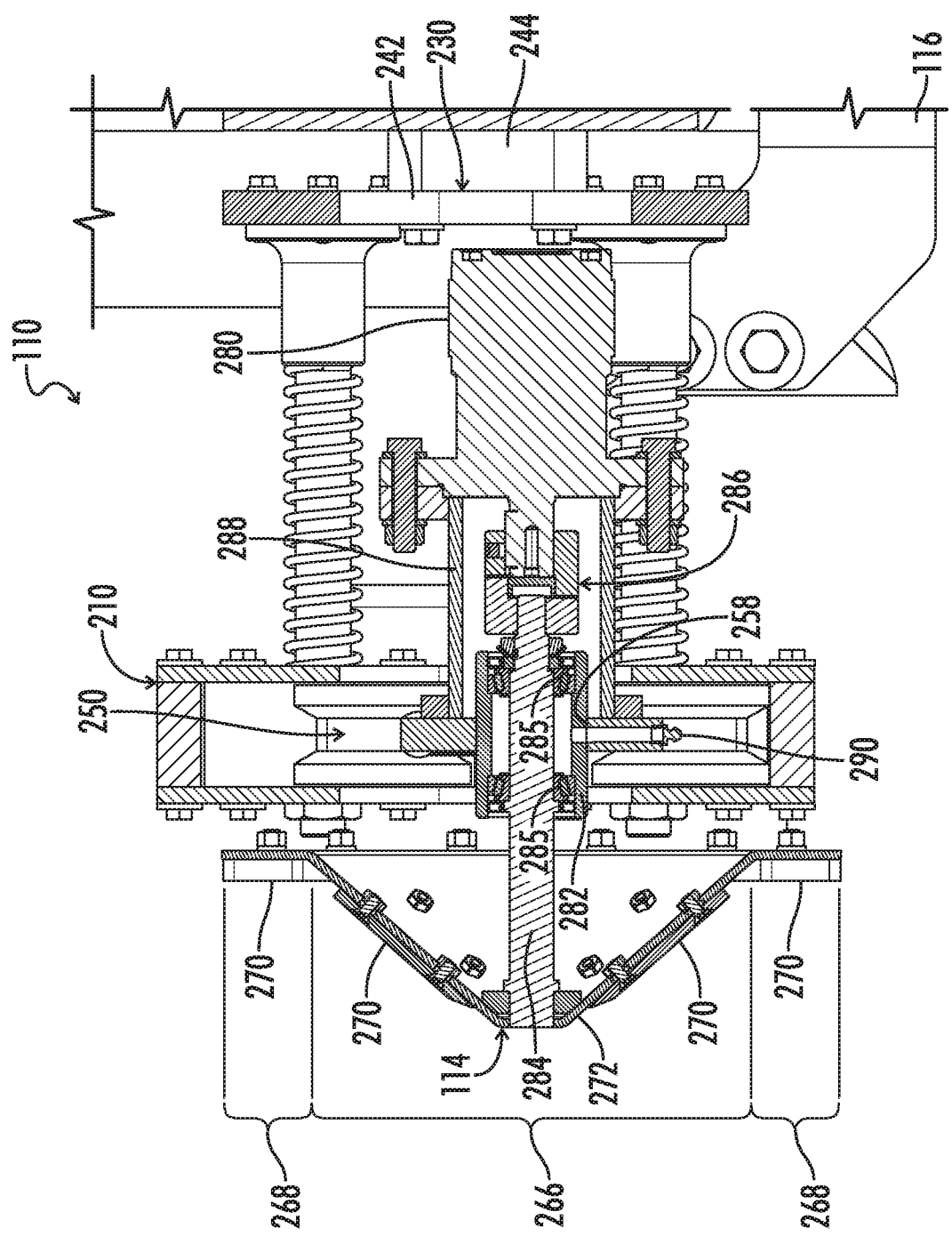
FIG. 16 is an enlarged cross-sectional side view of the vehicle clutch assembly of FIG. 10 taken along line 16-16 of FIG. 10.

As can best be seen in FIG. 16, the floating clutch part 114 may include a contoured portion 266 and a flat circular portion 268 surrounding the contoured portion 266. The flat circular portion 268 may also be referred to herein as a flat annular outer portion 268. The contoured portion 266 of the floating clutch part 114 may be configured to automatically correct any misalignment with the container clutch part 112 by engaging the contoured portion 166 of the container clutch part 112. The contoured portions 166, 266 of each of the container clutch part 112 and the floating clutch part 114, respectively, may be configured to be complementarily shaped to fit together. Similarly, the flat circular portions 168, 268 of each of the container clutch part 112 and the floating clutch part 114, respectively, may be configured to be complementarily shaped to fit together. As shown in the illustrated embodiment, the contoured portion 166 of the container clutch part 112 is concave (e.g., female) and the contoured portion 266 of the floating clutch part 114 is convex (e.g., male). In other embodiments (not shown), the contoured portion 166 of the container clutch part 112 may be convex and the contoured portion 266 of the floating clutch part 114 may be concave. In still further embodiments (not shown), the complementarily shaped contoured portions 166, 266 of each of the container clutch part 112 and the floating clutch part 114, respectively, may have a shape other than conical.

The flat circular portion 268 of the floating clutch part 114 may be configured to frictionally engage the flat circular portion 168 of the container clutch part 112. The flat circular portions 168, 268 of each of the container clutch part 112 and the floating clutch part 114, respectively, may be shaped or configured different in other embodiments (e.g., angled, toothed plates, interlocking protrusions, or the like).

The floating clutch part 114 may further include a friction material 270 connected to an outer surface 272 of the floating clutch part 114. The friction material 270 may also be referred to herein as a frictional pad 270. The friction material 270 may be configured to prevent slippage between the floating clutch part 114 and the container clutch part 112 when the floating clutch part 114 is rotated. As illustrated, the friction material 270 may be connected to or disposed on the flat circular portion 268 of the floating clutch part 114. Similarly, the friction material 270 may also be connected to or disposed on the contoured portion 266 of the floating clutch part 114 in a radial pattern 276 extending outward from a center of the contoured portion 266. The friction material 270 is shown bolted to the floating clutch part 114. In other embodiments (not shown), the friction material 270 may be attached to the floating clutch part 114 differently (e.g., glued, welded, or the like).

In other embodiments (not shown), the friction material 270 may also, or alternatively, be connected to an outer surface of the container clutch part 112.

As can best been seen in FIGS. 14 and 16-18B, the vehicle clutch assembly 110 may further include a motor 280 connected to the floating body 250 and extending beyond the housing 210 toward the carriage 116 of the transport vehicle 104. The motor 280 may be configured to rotate the floating clutch part 114. The motor 280 may float (or move in unison) with the floating body 250 and the floating clutch part 114. The motor 280 may be a hydraulic motor, an electric motor, or the like.

The floating body 250 is configured to rotate approximately 10 degrees in either the clockwise or the counterclockwise direction when the motor rotates. The amount of rotation may be limited by the size of the cavity 118 of the housing 210 relative to the size of the floating body 250 and bumpers 252. It will be appreciated to one of skill in the art that the floating body 250, in other embodiments (not shown), may rotate up to a maximum of less than 45 degrees.

As can best be seen in FIG. 16, the vehicle clutch assembly 110 may further include a float plate bearing housing 282 and a floating clutch shaft 284. The float plate bearing housing 282 may be connected to the floating body passageway 258. The float plate bearing housing 282 may be configured to receive and stabilize the floating clutch shaft 284. The floating clutch shaft 284 may be parallel to the forks 118 of the carriage 116. When the floating body is biased toward the central axis 254, the floating clutch shaft 284 may be aligned with the central axis 254. The floating clutch shaft 284 may be received in two spaced roller bearings 285 contained in the float plate bearing housing 282. The floating clutch shaft 284 is configured to connect the floating clutch part 114 to the motor 280 for transferring rotational movement from the motor 280 to the floating clutch part 114. The motor 280 may be connected to the floating clutch shaft 284 using a jaw coupling 286. In other embodiments (not shown), the motor 280 may be connected to the floating clutch shaft 284 using other coupling techniques such as a clamp shaft coupling, a screw coupling, a half coupling, a bushing coupling, or the like.

As illustrated, the motor 280 is connected to the floating body 250 using a floating motor mount 288. As illustrated, the floating motor mount 288 may be connected to each of the floating body 250 and the motor 280 using bolts. In other embodiments (not shown), the floating motor mount 288 may be connecting to each of the floating body 250 and the motor 280 using a different means (e.g., welding or the like). The floating motor mount 288 may house a portion of the floating clutch shaft 284 and the jaw coupling 286. The floating motor mount 288 allows for easier access to and simpler connection techniques to be used between the floating clutch shaft 284 and the motor 280.

The system may include a plurality lubrication inputs 290. At least one lubrication input is located on each of the container mounting bracket 144, the housing 210, and the floating body 250. The lubrication inputs 290 are configured to receive a lubricant (not shown) to aid in proper rotational connection functionality.

In certain embodiments, the system 100 may be controlled using electronic control methods to limit the amount of time that the hydraulic motor 280 provides rotation through the floating clutch part 114. This will help protect the friction material 270, the linkage 142, container clutch part 112, and various other system 100 components from damage in the event of improper alignment. It will also help to prevent continued rotation of the motor 280 and floating clutch part 114 once the release gate 126 of the proppant container 106 reaches the fully open or fully closed position 132, 130, respectively. The electronic control methods may be implemented using a controller (not shown).

The term "controller" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

In order for the system to automatically compensate for misalignment between the container clutch part 112 and the floating clutch part 114, there are certain movement thresholds that the floating body 250 may comply with. The floating body 250 may be able to float or move along the vertical direction 120 within the housing 210 equal to or greater than the potential "slop" in the vertical direction 120 as defined above. The floating body 250 may also be able to float or move along the lateral direction 134 within the housing 210 equal to or greater than the potential "slop" in the lateral direction 134 as defined above. These movement thresholds ensure that the floating clutch part 114 has an adequate movement range to cover all potential misalignment scenarios possible given the size differences between forks 118 and fork pockets 122.

Additionally, in order for the system to automatically compensate for misalignment between the container clutch part 112 and the floating clutch part 114, there are certain size requirements that the contoured portion 166 of the container clutch part 112 may comply with. The contoured portion 166 of the container clutch part 112 may have a radius that is greater than the greater of: (a) one-half of a difference between the fork pocket width 122W and the fork width 118W; and (b) a difference between the fork pocket height 122H and the fork height 118H. When the fork pocket spacers 136 are implemented, the radius of the contoured portion 166 of the container clutch part 112 may be greater than the greater of: (a) one-half of a difference between the fork pocket width 122W and the fork width 118W; and (b) a difference between the fork pocket height 122H minus the fork pocket spacer height 136H and the fork height 118H. These size requirements for the contoured portion 166 of the container clutch part 112 ensure that the center of the contoured portion 266 of the floating clutch part 114 when biased toward the central axis 254 is able to engage the contoured portion 166 of the container clutch part 112.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A method of transferring proppant for fracking, the method comprising the steps of:
   (a) engaging a container housing the proppant using at least one lifting attachment connected to a transport vehicle;
   (b) engaging a rotatable container clutch part connected to the container with a rotatable floating clutch part connected to the transport vehicle;
   (c) transporting the container to a release location using the transport vehicle and the at least one lifting attachment; and
   (d) actuating the container clutch part with the floating clutch part to rotate the container clutch part and cause the container to release the proppant at the release location.

2. The method of claim 1, wherein step (b) further includes automatically aligning the floating clutch part with the container clutch part.

3. The method of claim 1, wherein step (b) further includes sliding a contoured portion of the floating clutch part within a contoured portion of the container clutch part to align the floating clutch part with the container clutch part.

4. The method of claim 1, wherein step (d) further includes transferring rotational movement of the container clutch part to an actuator connected to the container to cause the proppant to be released.

5. The method of claim 1, wherein step (d) further comprises:
   rotating the container clutch part in a first direction and thereby opening a gate valve connected to the container to release the proppant through the gate valve; and
   rotating the container clutch part in a second direction opposite to the first direction and thereby closing the gate valve.

6. An engagement apparatus for a forklift to selectively engage a container clutch part connected to a fracking proppant container, the attachment apparatus comprising:
   a housing configured to be connected to a carriage of the forklift; and
   a floating body positioned within the housing, the floating body having a rotatable engagement part connected to the floating body and extending beyond the housing away from the carriage, the floating body being laterally positionable within the housing to align the rotatable engagement part with the container clutch part in a lateral direction.

7. The engagement apparatus of claim 6, wherein the floating body is vertically positionable within the housing to align the rotatable engagement part with the container clutch part in a vertical direction.

8. The engagement apparatus of claim 7, wherein the floating body is biased toward a central location in the housing using resilient members coupled between the floating body and the housing.

9. The engagement apparatus of claim 8, wherein the resilient members are generally aligned with the lateral direction.

10. The engagement apparatus of claim 6, wherein the floating body includes bumpers connected to the floating body, the bumpers configured to prevent the floating body from striking the housing.

11. The engagement apparatus of claim 6, wherein the rotatable engagement part includes a contoured portion to automatically correct any misalignment when engaging the container clutch part.

12. The engagement apparatus of claim 6, wherein the rotatable engagement part includes a friction material connected to an outer surface of the rotatable engagement part, the friction material configured to prevent slippage between the rotatable engagement part and the container clutch part when the rotatable engagement part is rotated.

13. The engagement apparatus of claim 12, wherein the friction material is disposed along a flat annular outer portion of the rotatable engagement part.

14. The engagement apparatus of claim 12, wherein the friction material is disposed in a radial pattern extending outward from a center of a contoured portion of the rotatable engagement part.

15. The engagement apparatus of claim 6, further including a motor mounted to the floating body and extending beyond the housing toward the carriage, the motor configured to rotate the rotatable engagement part.

16. The engagement apparatus of claim 6, further including a mounting bracket connected between the housing and the carriage, the mounting bracket configured to allow the housing to move in a rearward direction relative to the carriage when the rotatable engagement part engages the container clutch part.

17. The engagement apparatus of claim 16, wherein:
the mounting bracket includes a base plate and a plurality of posts;
the housing includes passageways extending through the housing, the passageways configured to receive the posts; and
each post is surrounded by a compressive member spanning between the base plate and the housing, the compressive members configured to allow movement of the housing in the rearward direction.

18. A fracking proppant container comprising:
a storage compartment including a release gate connected to a lower portion of the storage compartment, the release gate including an actuator configured to move the release gate between an open position and a closed position;
a container clutch shaft rotatably connected to the storage compartment;
a container clutch member connected to the container clutch shaft; and
a linkage connecting the container clutch shaft to the actuator to transfer rotational movement of the container clutch shaft to the actuator to actuate the release gate.

19. The fracking proppant container of claim 18, wherein the container clutch member includes a contoured portion.

20. The fracking proppant container of claim 19, wherein the contoured portion is conically shaped.

21. The fracking proppant container of claim 19, wherein the contoured portion is concave.

22. The fracking proppant container of claim 18, wherein the container clutch member includes a flat circular portion surrounding a contoured portion, the flat circular portion generally perpendicular to the container clutch shaft.

23. The fracking proppant container of claim 18, wherein the linkage comprises a first sprocket connected to the actuator, a second sprocket connected to the container clutch shaft, and a drive chain extending between the sprockets.

24. The fracking proppant container of claim 18, further comprising fork pockets configured to receive forks of a forklift for lifting and moving the fracking proppant container, the fork pockets parallel with the container clutch shaft.

25. A system for transferring proppant for fracking comprising:
a transport vehicle having a carriage with forks extending from the carriage;
a proppant container having fork pockets, a storage compartment, and a release gate connected to the storage compartment, the release gate having an actuator for moving the release gate between an open and a closed position, the fork pockets configured to receive and engage the forks of the transport vehicle;
a container clutch part connected to the proppant container, the container clutch part further connected to the actuator; and
a floating clutch part connected to the carriage of the transport vehicle and configured to engage the container clutch part when the forks engage the fork pockets of the proppant container, the floating clutch part configured to be selectively rotated by the transport vehicle when engaged with the container clutch part to move the release gate between the open and closed positions.

26. The system of claim 25, wherein the container clutch part is connected to the actuator such that rotational movement of the container clutch part is transferred to the actuator.

27. The system of claim 25, wherein the floating clutch part is laterally positionable relative to the carriage to align with the container clutch part.

28. The system of claim 25, wherein the floating clutch part is vertically positionable relative to the carriage to align with the container clutch part.

29. The system of claim 25, wherein the container clutch part and the floating clutch part each include a complementary contoured portion configured to fit together.

30. The system of claim 29, wherein each of the contoured portions of the container clutch part and the floating engagement part is surrounded by a circular flat portion.

31. The system of claim 29, wherein the contoured portion of the container clutch part is concave and the contoured portion of the floating clutch part is convex.

32. The system of claim 29, wherein:
each fork pocket includes a fork pocket height and a fork pocket width;
each fork includes a fork height and a fork width;
the contoured portion of the container clutch part includes a radius greater than the greater of:
one half of a difference between the fork pocket width and the fork width; and
a difference between the fork pocket height and the fork height.

33. The system of claim 25, further comprising a motor connected to the floating clutch part for driving rotation of the floating clutch part.

* * * * *